(12) United States Patent
Stuart et al.

(10) Patent No.: US 11,285,583 B2
(45) Date of Patent: Mar. 29, 2022

(54) FASTENER PIN REMOVAL TOOL

(71) Applicant: The Boeing Company, Chicago, IL (US)

(72) Inventors: Mark A. Stuart, Auburn, WA (US); Scott A. Miller, Auburn, WA (US)

(73) Assignee: The Boeing Company, Chicago, IL (US)

( * ) Notice: Subject to any disclaimer, the term of this patent is extended or adjusted under 35 U.S.C. 154(b) by 224 days.

(21) Appl. No.: 16/791,224

(22) Filed: Feb. 14, 2020

(65) Prior Publication Data

US 2021/0252674 A1 Aug. 19, 2021

(51) Int. Cl.
*B25B 11/00* (2006.01)
*B25B 13/06* (2006.01)
*B25B 23/00* (2006.01)
*B23P 11/00* (2006.01)
*B25B 13/48* (2006.01)

(52) U.S. Cl.
CPC ............ *B25B 13/06* (2013.01); *B23P 11/005* (2013.01); *B25B 23/0035* (2013.01); *B25B 23/0071* (2013.01); *B25B 13/481* (2013.01)

(58) Field of Classification Search
CPC ..... B25B 27/00; B25B 27/023; B25B 27/062; B23P 11/00; B23P 11/005
See application file for complete search history.

(56) References Cited

U.S. PATENT DOCUMENTS

| | | | | |
|---|---|---|---|---|
| 4,335,493 A | * | 6/1982 | Shivers, Jr | B25B 27/02 29/254 |
| 5,341,553 A | * | 8/1994 | Herzhauser | B25B 27/023 29/261 |
| 6,526,641 B1 | * | 3/2003 | Latham | B25B 27/026 29/239 |
| 8,402,864 B1 | * | 3/2013 | Stephens | B25B 13/04 81/177.2 |
| 2013/0160264 A1 | * | 6/2013 | Reyes | B25B 13/488 29/278 |
| 2021/0252674 A1 | * | 8/2021 | Stuart | B25B 23/0071 |

* cited by examiner

*Primary Examiner* — Lee D Wilson

(57) ABSTRACT

Examples provide a method and apparatus for fastener pin removal. A fastener pin removal tool includes a tool body having a workpiece interface surface, a threaded hole and opposing side edges. A fitting is coupled to the end of the threaded screw that is proximate the workpiece interface surface. The fitting includes a keyhole-slot configured to receive the head of a pin. The keyhole-slot defines a set of spaced-apart jaws configured to engage the head of the pin that is received within the keyhole-slot. A rotational end-piece is coupled to the threaded screw and rotates to cause the fitting and the set of spaced-apart jaws to pull the head of the pin received within the keyhole-slot. As the rotational end-piece pulls the pin head, the pin is removed from a workpiece.

20 Claims, 19 Drawing Sheets

FASTENER PIN REMOVAL TOOL

BACKGROUND

Unthreaded fastener pins are frequently used to hold composite parts onto mandrels or other structures during processing in ovens or other work. Once the work is done, pliers and small pry bars are used to pull pins out of the mandrels. In some cases, extreme pull forces or leverage is required to remove the pins.

SUMMARY

The disclosed examples are described in detail below with reference to the accompanying drawing figures listed below. The following summary is provided to illustrate implementations disclosed herein. It is not meant, however, to limit all examples to any particular configuration or sequence of operations.

Some aspects and implementations disclosed herein are directed at a pin removal tool. An implementation includes a tool body having a workpiece interface surface, a threaded hole and opposing side edges having a plurality of contoured edges to generally align with fingers of a user. A threaded screw is disposed in and rotatable relative to the threaded hole in the tool body. A fitting is coupled to the end of the threaded screw that is proximate the workpiece interface surface. The fitting includes a keyhole-slot to receive the head of a pin. The keyhole-slot defines a set of spaced-apart jaws configured to engage the head of the pin that is received within the keyhole-slot. A rotational end-piece is coupled to the threaded screw. The rotational end-piece rotates and displaces the threaded screw relative to the tool body to cause the fitting and the set of spaced-apart jaws to pull the head of the pin received within the keyhole-slot. The pin removal tool thereby removes the pin from the workpiece.

The features, functions, and advantages that have been discussed are achieved independently in various implementations or are to be combined in yet other implementations, further details of which are seen with reference to the following description and drawings.

BRIEF DESCRIPTION OF THE DRAWINGS

Corresponding reference characters indicate corresponding parts throughout the drawings.

DETAILED DESCRIPTION

Figure 1:
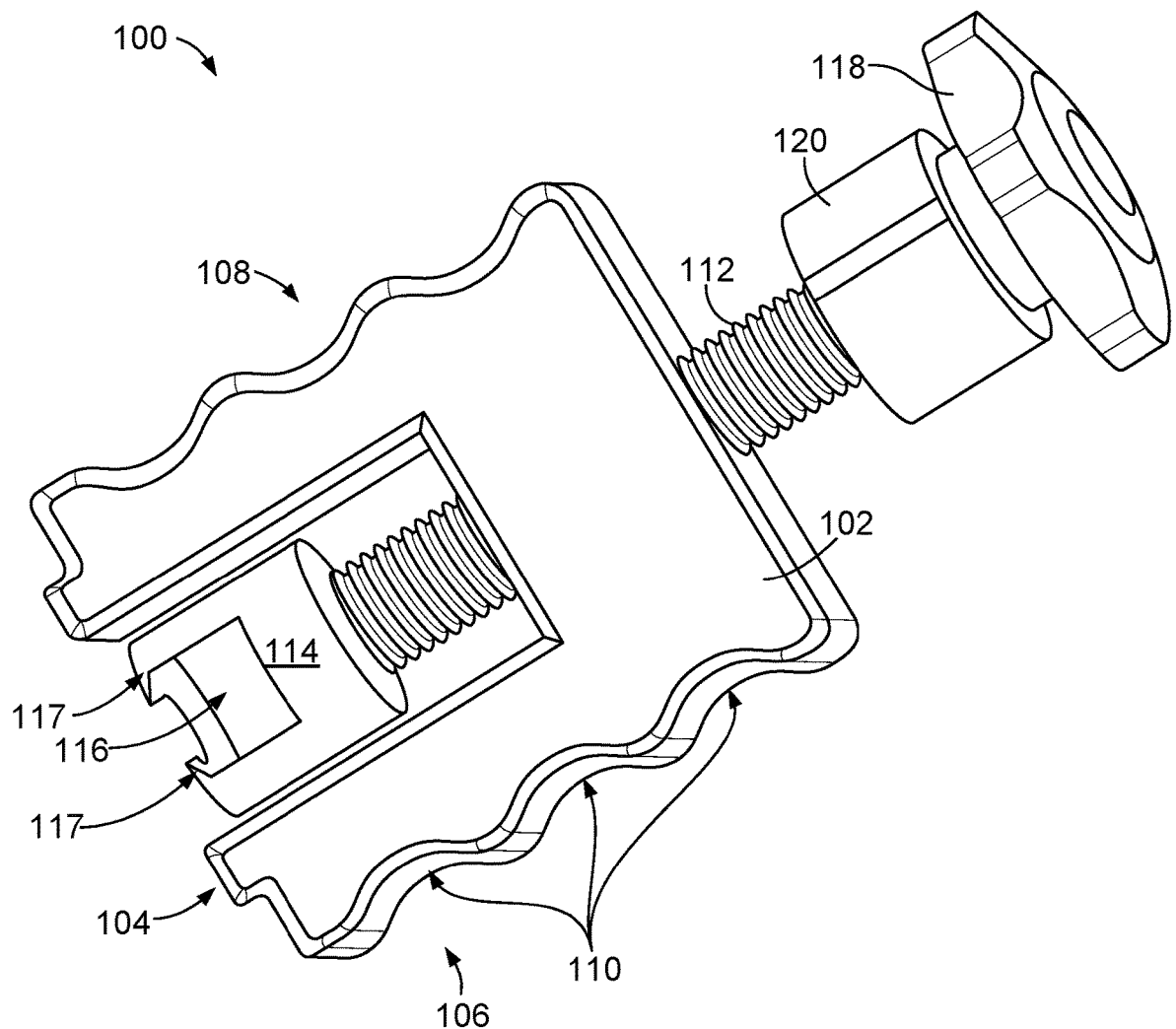
FIG. 1 is an exemplary block diagram illustrating a pin pulling tool for removing pins from a workpiece.

The various implementations will be described in detail with reference to the accompanying drawings. Wherever possible, the same reference numbers will be used throughout the drawings to refer to the same or like parts. References made throughout this disclosure relating to specific implementations and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to "one implementation" are not intended to be interpreted as excluding the existence of additional implementations that also incorporate the recited features. Moreover, unless explicitly stated to the contrary, implementations "comprising" or "having" an element or a plurality of elements having a particular property could include additional elements not having that property.

Currently, pins can be removed from workpieces or other structures, such as mandrels, using grip pliers or pry bars to remove the pins. Parts and structures may be damaged during the pin removal process using pliers and pry bars. As the pins are being pulled out of the structure, operators often do not have enough control or space to keep the pliers or pry bars from making contact with and damaging other sides or parts of the workpiece structure. The likelihood of damaging parts using pliers and pry bars increases when removing pins from the narrower ends of structures. Many labor hours are required to process parts reaching this part of the manufacturing cycle, and damage to parts during pin removal can be very costly.

Moreover, pin removal using pliers and pry bars frequently requires a user to apply excessive hand grip and pull forces, which may increase risk of injury to users. The grip force necessary to pull the pins out may expose users to musculoskeletal disorder (MSD) risks that often develop into sprain and strain-related injuries over time. Furthermore, structures or parts can be damaged during the pin removal process if the pliers and pry bars inadvertently make impact with another side of the part with high force. The ends of mandrels can be very narrow making it difficult or impractical for users to remove pins using pliers in limited-access areas.

Aspects of the disclosure provide a pin pulling tool for removing unthreaded fastener pins from workpiece structures, such as, but not limited to, fixtures and mandrels, while minimizing damage to workpieces as well as limiting risk to users. The pin pulling tool includes a fitting coupled to the end of a threaded screw configured to engage the head of a pin. A rotational end-piece rotates to displace the threaded screw causing the fitting to pull the head of the pin out of the workpiece smoothly with less effort and minimal force. The tool enables a user to remove pins while minimizing the likelihood of injury to users and damage to structures.

The pin pulling tool in other examples is an ergonomic, low profile tool suitable for utilization in limited access areas and confined spaces. This enables easier and more efficient pin removal in areas providing limited maneuverability while mitigating the risk of damaging structures, workpieces or expensive parts. The tool further eliminates risk of musculoskeletal disorder (MSD) or other injury to users. This further reduces operating costs while improving user safety and comfort.

Referring more particularly to the drawings, FIG. 1 provides an exemplary block diagram illustrating a pin pulling tool 100 for removing pins from a workpiece. In some examples, the pin pulling tool 100 includes a tool body 102 having a workpiece interface surface 104. The workpiece interface surface 104 is a surface of the tool body which contacts the exterior surface of a workpiece, such as, but not limited to, a mandrel or other structure in which is a pin is at least partially embedded.

The tool body 102 in other examples includes a threaded hole (shown in FIG. 3 below) running vertically through the tool body 102. A threaded screw 112 is at least partially disposed within the threaded hole. The threaded screw 112 is rotatable relative to the threaded hole in the tool body 102. In some examples, the threaded screw 112 is a threaded shaft. If the threaded screw 112 includes a screw head, the threaded screw 112 is referred to as a threaded bolt.

The tool body 102 in some examples includes opposing side edges 106 and 108 having a plurality of contoured recesses 110 along each side edge. The contoured recesses 110 are arranged to generally align with fingers of a user to enable the user to apply a firm grasp to the tool body or otherwise grip at least a portion of the tool body. Terms grip refers to grasping, holding, or otherwise securing a portion of the tool body. The arrangement of the contoured recesses refers to the layout or positioning of the recesses on the tool body.

In this example, the contoured recesses 110 are shown to include three contoured recesses on each side. However, the examples are not limited to three contoured recesses on each side. In other examples, the contoured recesses 110 include a single contoured recess on each side, two contoured recesses on each side, or additional contoured recesses on each side. In other examples, one or more sides of the tool body 102 does not include any contoured recesses. In other words, there may be one or more contoured recesses 110 on one side of the tool body and no contoured recesses on the opposing side of the tool body. In yet other examples, the tool body does not include any contoured recesses.

In some examples, the contoured recesses 110 are continuous around the tool body. In these examples, the tool body is a substantially cylindrical shape. In other examples, the contoured recesses are grooves on opposing sides.

The contoured recesses in other examples include a rubberized housing or other non-slip material on the exterior surface to assist the user with maintaining their grip on the tool body and/or increasing friction to prevent slipping. The tool body 102 can also optionally include grip tape, rough (non-smooth) surface elements, or other slip resistant covering to provide tactility so the tool body is easier to hold.

A fitting 114 coupled to the end of the threaded screw 112 is proximate the workpiece interface surface 104. The fitting can be composed of aluminum, steel, a composite metal, plastic or any other suitable material.

The fitting 114 in some examples includes a keyhole-slot 116 configured to receive the head of a pin which is at least partially embedded or inserted into a structure, such as a workpiece. The keyhole-slot 116 defines a set of one or more spaced-apart jaws 117 configured to engage the head of the pin that is received within the keyhole-slot 116.

In some non-limiting examples, a rotational end-piece 118 is coupled to the threaded screw 112. The rotational end-piece 118 may be directly coupled to the head of the threaded screw 112 or removably connected to the threaded screw via a socket 120. The rotational end-piece 118 is configured to rotate clockwise and/or counter-clockwise. When the rotational end-piece 118 is rotated, the threaded screw 112 is displaced relative to the tool body 102 to cause the fitting 114 and the set of spaced-apart jaws 117 to pull the head of the pin received within the keyhole-slot 116. The displacement lifts or pulls the head of the pin to thereby remove the pin from the workpiece in which the pin is at least partially embedded or inserted.

In other examples, the pin pulling tool 100 is a low-profile tool containing a fitting 114 coupler on the bottom of the tool and a small rotational end-piece 118, such as a palm ratchet for example, with an attached socket 120 device on the top. The fitting can be referred to as a pin fitting, a fitting coupler, a pin coupler, a removable fitting, or a pin coupler fitting. The fitting 114 coupler is connected to the end of the threaded bolt within the tool housing. A user slides the fitting 114 coupler over the head of a pin to be removed. When the rotational end-piece 118 is twisted in a clockwise direction, the threaded bolt is slightly raised out of the tool housing. This action simultaneously raises the height of the fitting 114 coupler and pulls the pin out of the structure. In other examples, the rotational end-piece 118 is twisted or turned in a counter-clockwise direction to raise the height of the fitting 114 and remove the pin from the structure.

The pin pulling tool 100 in other examples stays flush against a surface or structure while only the fitting 114 is raised off the exterior surface of the workpiece. By having the pin puller tool remain flush against the surface as the pin fitting is raised, risk of damaging the workpiece surface, which may include expensive parts or structures, is mitigated during the pin removal process. The low-profile of the pin pulling tool 100 enables it to be used in many confined, limited-access areas.

The pin puller tool, in other examples, significantly reduces the MSD risk factors technicians are exposed to, thus substantially reducing the likelihood of developing costly sprain and strain-related injuries. Additionally, its low-profile design significantly mitigates risks of damaging expensive parts and structures during pin removal processes. The pin pulling tool 100 can be used in a variety of situations and environments, including manufacturing, industry, repair, replacement, maintenance, etc. For example, the pin pulling tool 100 may be used in a machine shop, automobile manufacture, ship building, aircraft construction, home appliances, or any other type of manufacture.

The pin pulling tool 100 in still other examples, integrates the rotational end-piece 118 with the fitting 114 to pull pins out of structures without damaging expensive or delicate parts while minimizing ergonomic risks to operators utilizing the tool, equipment near the operator or other users within the vicinity of the pin removal operation. The fitting 114 is a removable pin fitting in some examples.

Figure 2:
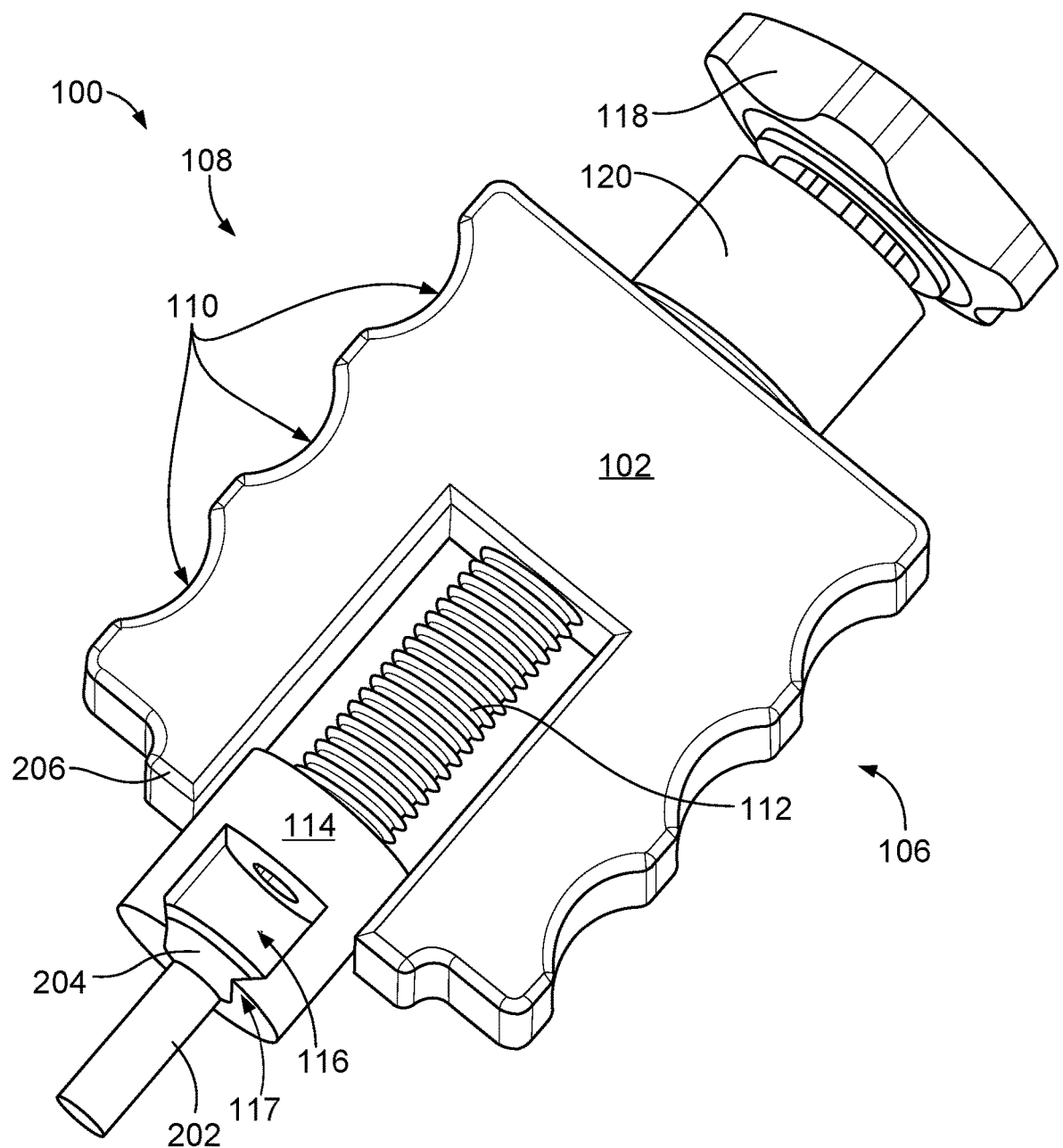
FIG. 2 is an exemplary block diagram illustrating an isometric view of the pin pulling tool.

FIG. 2 is an exemplary block diagram illustrating an isometric view of the pin pulling tool 100. The pin pulling tool 100 includes a rotational end-piece 118 capable of removably connecting to a socket 120. The socket removably attaches to a head of the threaded screw 112. A fitting 114 is placed over the head of the pin. The fitting 114 includes a keyhole-slot 116 having a set of spaced-apart jaws 117 that slip under the pin head to engage the head 204 of the pin when the head of the pin is inside the keyhole-slot 116.

In some examples, as the rotational end-piece is rotated or turned by a user, the socket likewise rotates the threaded screw within the tool body 102. The user can optionally grip the tool body along the contoured recesses 110 along one or more of the opposing side edges 106 and 108 of the tool body to steady the tool as the rotational end-piece is turned. The rotation of the threaded screw pulls or raises the height of the fitting 114 engaging the head 204 of a pin 202.

The pin 202 is any type of fastener pin which is at least partially inserted or embedded within a workpiece. The pin 202 is lifted out of the workpiece by the pin pulling tool with little or no force required on the part of the operator. The tool provides a smooth lifting motion which pulls the pin from the workpiece while minimizing scraping or damage to the workpiece.

The fitting 114 in this example is removably attached to the end of the threaded screw 112, such as by a threaded bolt (shown in FIG. 3 below). In other examples, the fitting 114 is coupled to the end of the threaded screw 112 by at least one of welding, bonding or a press-fit.

In other examples, the pin pulling tool 100 includes the rotational end-piece coupled to the fitting via the socket 120. The rotational end-piece in this example is a ratchet mechanism. The socket conforms to the threaded bolt head. The two complimentary pieces, the socket and the threaded bolt head snap, lock, interconnect or otherwise couple together. The socket conforms to the bolt head where the socket fits within a recess of the bolt head.

The pin pulling tool 100 in other examples can also include a chamfer 206 associated with the fitting. The chamfer 206 is a sloping or beveled edge along the interface of the exterior surface of the tool body coming into contact with the exterior surface of the workpiece. The chamfer 206 creates a transitional edge between the surface of the pin pulling tool and the workpiece surface. The chamfer 206 may be implemented along the edges and/or corners of the workpiece interface surface. The chamfer 206 minimizes sharp edges associated with the interface between the fitting and the workpiece to further protect the workpiece from scratches or other damage during pin removal procedures. Sharp edges can result from metal edges, rough cut edges, surfaces that are rough, etc.

Figure 3:
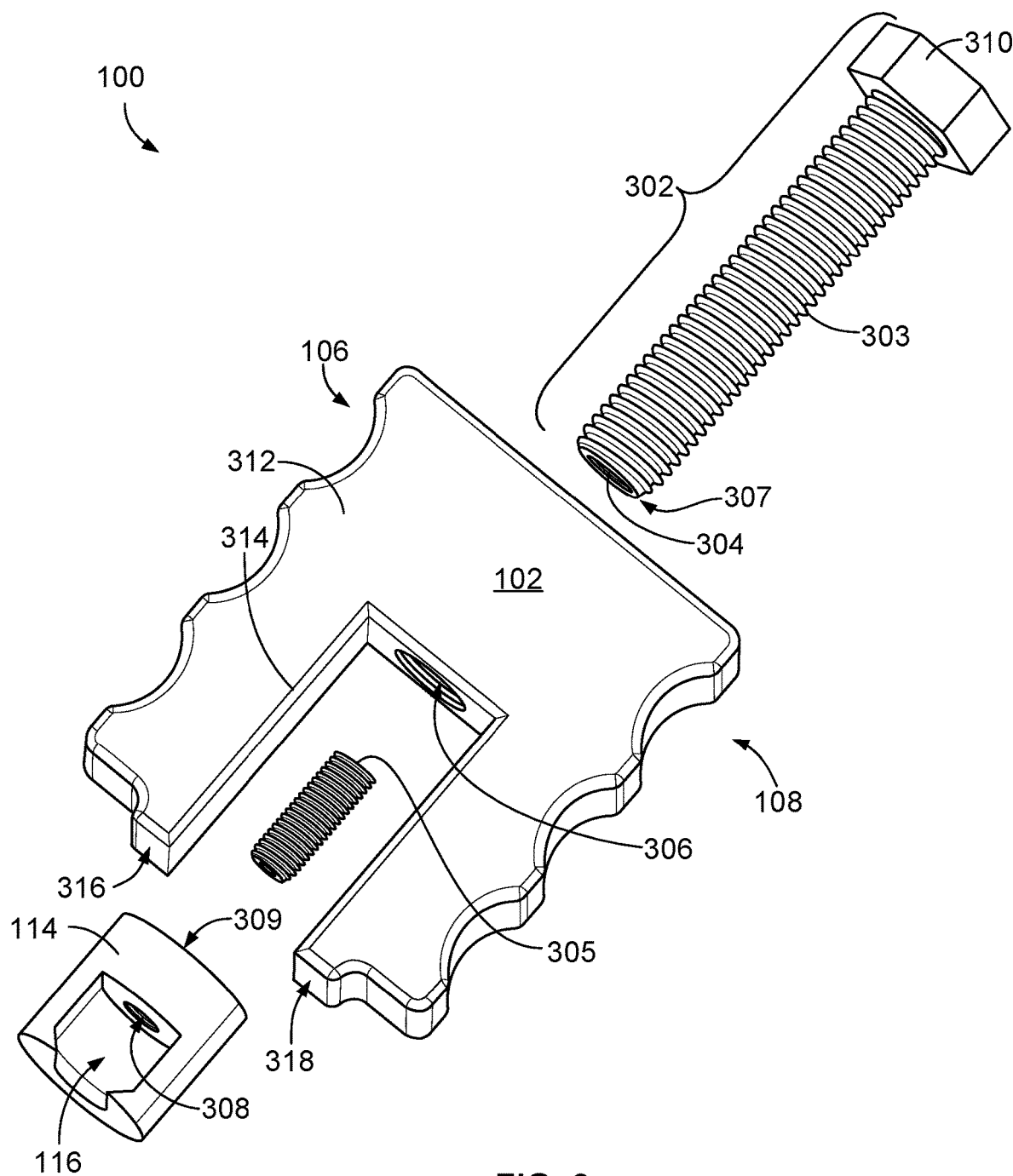
FIG. 3 is an exemplary block diagram illustrating an exploded view of the pin pulling tool.

FIG. 3 is an exemplary block diagram illustrating an exploded view of the pin pulling tool 100. The pin pulling tool 100 includes a threaded screw, such as threaded screw 112, that can be implemented as a bolt 302. The threaded bolt 302 is a bolt including a threaded shaft 303 member and a drive head 310. A member is a portion, piece or part of the tool.

In some examples, the pin pulling tool 100 includes a plate 312 having a notch 314. The interface surface includes first interface surface 316 and a second interface surfaces 318 proximate the end of the notch 314. The threaded hole 306 extends through at least a portion of the thickness of the plate 312 and into the notch 314.

In other examples, a distal end 307 of the threaded bolt 302 includes a threaded housing 304 at a distal end 307 of the threaded shaft 303. The threaded housing 304 defines an interior space configured to accommodate a portion of a first end of a threaded stud 305. The second end of the threaded stud 305 is configured to fit within a threaded hole 308 associated with the pin fitting. The threaded stud 305 couples to the pin fitting via the threaded hole 308 at one end of the threaded stud 305. The threaded stud 305 couples to the threaded bolt 302 via the threaded housing 304 at the opposing end of the threaded stud 305.

The threaded bolt 302 is an example of a threaded screw 112 having a drive head 310. The distal end 307 of the threaded bolt 302 can be coupled to the fitting 114 by a threaded stud 305 at least partially coupled to the threaded housing 304 at the distal end 307 of the threated bolt 302 and coupled to the fitting 114 at an attachment end 309 of the fitting 114. In some examples, the threaded stud has a reverse thread opposite the threaded bolt thread so as the threaded bolt or the threaded screw rotates, the threaded stud does not separate from the fitting and the threaded bolt. In this example, the fitting 114 is a removable fitting.

In some examples, the threaded stud 305 connects the fitting 114 to one end of the threaded bolt 302. The threaded stud 305 includes a threaded shaft without a head. When the rotational end-piece is turned, the threaded bolt and the fitting are rotated together as an integral unit. The threaded stud 305 mechanism connects the top portion of the interchangeable fitting to the larger threaded bolt or threaded screw. Rotation of the threaded bolt and the fitting are controlled directly by movement of the rotational end-piece. In this example, the threaded a partially threads into threaded bore (shown below at FIG. 22 and FIG. 23) at the top portion of the fitting and partially threads into the distal end of the threaded bolt or threaded screw.

In other examples, the fitting is permanently coupled to the threaded screw or threaded bolt. In these examples, the stud may be welded, bonded or press-fit to the threaded screw or otherwise permanently affixed to the threaded bolt 302.

Figure 4:
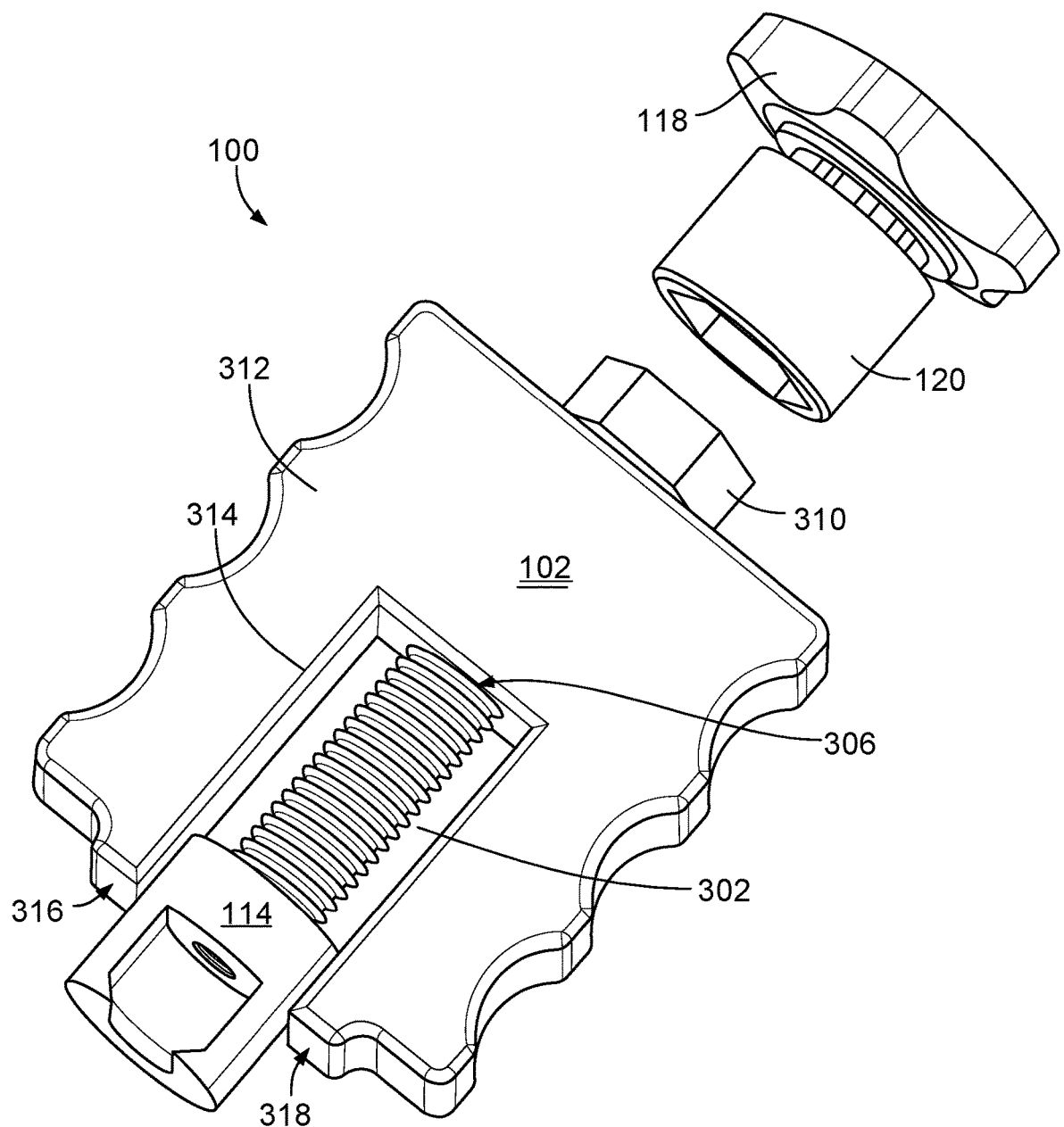
FIG. 4 is an exemplary block diagram illustrating a pin pulling tool with detachable rotational end-piece and socket.

FIG. 4 is an exemplary block diagram illustrating a pin pulling tool 100 with detachable rotational end-piece 118 and socket 120. In this example, the rotational end-piece 118 and the socket 120 are detachably connected. The rotational end-piece 118 detachably connects to a variety of different sockets for removably attaching to the drive head 310 of the threaded bolt 302 or other threaded screws having a variety of different size and shape screw heads.

In other examples, the socket 120 is integrated into the rotational end-piece 118 such that the socket 120 does not detach from the rotational end-piece. In other words, the rotational end-piece 118 is coupled to the threaded bolt 302 directly without a socket 120. In these examples, the rotational end-piece 118 includes a permanently attached or integrated socket capable of removably connecting the rotational end-piece to the drive head 310 of the threaded bolt 302 or other threaded screws. In still other examples, the rotational end-piece is non-removably attached to the drive head 310 of the threaded bolt 302.

The pin pulling tool 100 includes a plate 312 in this example. The interface surface includes first interface surface 316 and a second interface surfaces 318 proximate the end of the notch 314 associated with the plate 312. The threaded shaft of the threaded bolt 302 is deployed all the way down through the tool body. The threaded bolt 302 extends through the threaded hole 306, down through the thickness of the plate 312 and into the notch 314.

Figure 5:
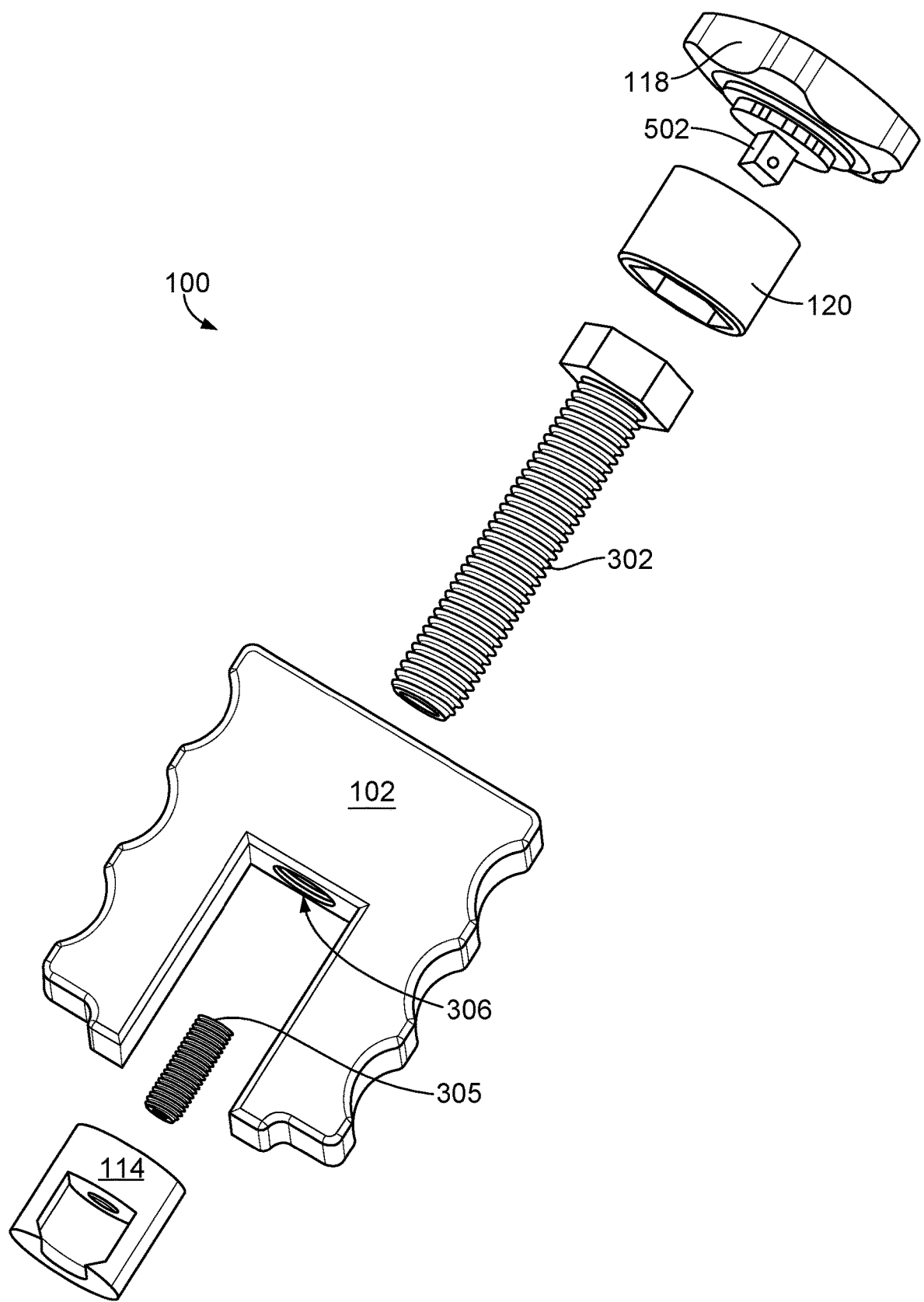
FIG. 5 is an exemplary block diagram illustrating an isometric exploded view of a pin pulling tool.

FIG. 5 is an exemplary block diagram illustrating an isometric exploded view of a pin pulling tool 100. The pin pulling tool 100 in this example includes a rotational end-piece 118 including an adapter 502 for removably connecting the rotational end-piece 118 to the socket 120, which fits over the threaded bolt 302 head of the tool unit.

The adapter in this example is in the form of a square or hex that fits into a rotational piece on the socket that turns. As one example, the adapter is like a socket wrench adapter that fits into the socket. It is an extension from the rotational end-piece that fits into the rotating part of the threaded bolt 302. The adapter couples the rotational end-piece to the socket enabling the socket to couple to the threaded bolt 302.

The adapter 502 in some examples fits within a recess of the socket. In other examples, the adapter snaps or couples to a connector within the socket such that the adapter fits within the circumference of the socket. In still other examples, the socket fits into or couples directly to the threaded screw or bolt.

The adapter 502 in these examples extends down from the bottom of the rotational end-piece 118. It is relatively smaller than the rotational end-piece 118 and snaps into the threaded bolt 302, threaded bolt or the socket. It accommodates various sockets that can attach to the rotational end-piece as one unit. The adapter 502 fits into the socket which is the appropriate size for the bolt.

The socket 120 is configured to fit over the head of the threaded bolt 302 or other threaded screw, which slides through the threaded hole 306 within the tool body 102. One end of the threaded stud 305 screws into the distal end of the threaded bolt 302 while the other end of the threaded stud 305 screws into a threaded bore (shown below in FIG. 22 and FIG. 23) at the attachment end of the fitting 114 to connect the fitting to the threaded bolt 302. As the rotational end-piece is turned by the user, the threaded bolt 302 rotates to lift the fitting. If the fitting is secured over the head of a pin within a workpiece, the fitting pulls the pin out of the workpiece.

In other examples, the adapter 502 on the rotational end-piece fits directly into a slot, indentation or recess on the end of the threaded bolt 302 or other threaded screw. Turning the rotational end-piece directly rotates the threaded bolt 302 in these examples. Thus, the rotational end-piece couples to the threaded bolt 302 via the socket 120 or via an adapter that fits into the end of the threaded bolt 302. In still other examples, the rotational end-piece couples directly to the end of the threaded bolt 302.

In some examples, the fitting 114 is removably coupled to the end of the threaded bolt 302 via the threaded stud 305. The fitting 114 can be removed or otherwise detached by unscrewing the fitting from the end of the threaded stud 305. Another fitting having a different size or shape can then be interchangeably attached to the pin pulling tool 100 by screwing the threaded stud 305 into the threaded bore at the attachment end of the new fitting.

In these examples, the pin pulling tool is a modular tool having a plurality of fittings. Each fitting includes a keyhole-slot configured to receive the head of a pin in a plurality of different pin sizes and pinhead shapes. Each fitting is configured to interchangeably couple to the pin pulling tool 100 to fit the size and shape of the fastener pin to be removed.

Figure 6:
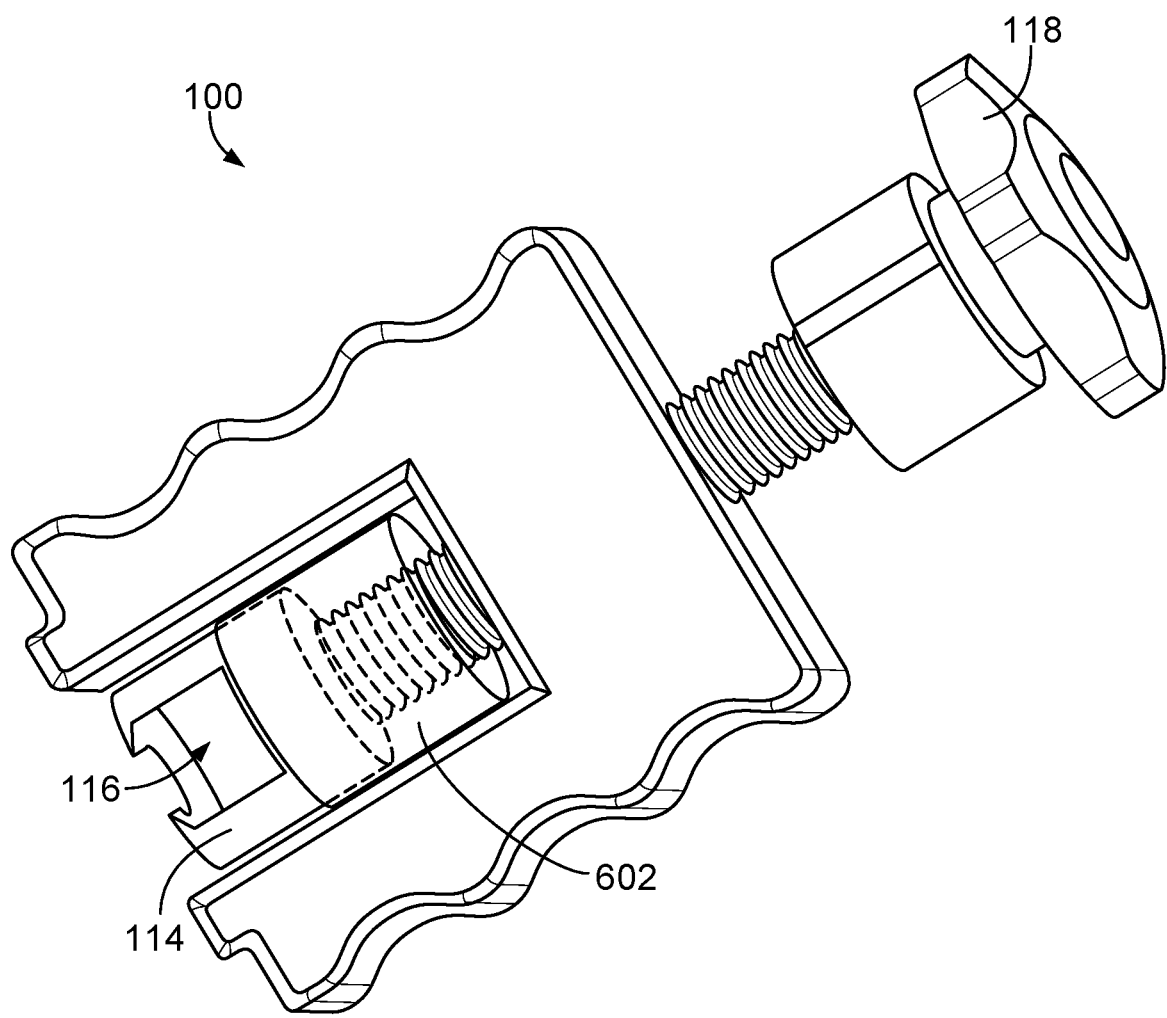
FIG. 6 is an exemplary block diagram illustrating a pin pulling tool including a closure sleeve.

FIG. 6 is an exemplary block diagram illustrating a pin pulling tool 100 including a closure sleeve 602. In some examples, the closure sleeve 602 is a sleeve configured to encompass or otherwise enclose the fitting 114 and the head of the pin that is received within the keyhole-slot 116 of the fitting 114. In this example, the closure sleeve 602 is positioned above the fitting 114 in an open position to expose the fitting 114 and the head of the pin (if any) that is received within the keyhole-slot of the fitting. The closure sleeve 602 is placed into the open position prior to engaging the fitting over the pin head for removal of the pin. Once the fitting is secured over the pin head, the closure sleeve 602 slides down or is lowered by the user to prevent the fitting from sliding off the head of the pin as the rotational end-piece 118 is being turned by the user during pin removal.

In some examples, the closure sleeve 602 is held in the open position by a notch, ridge, or lip. In still other examples, the closure sleeve 602 is secured in the open position by a clip or other device for securing the closure sleeve above the fitting 114.

Figure 7:
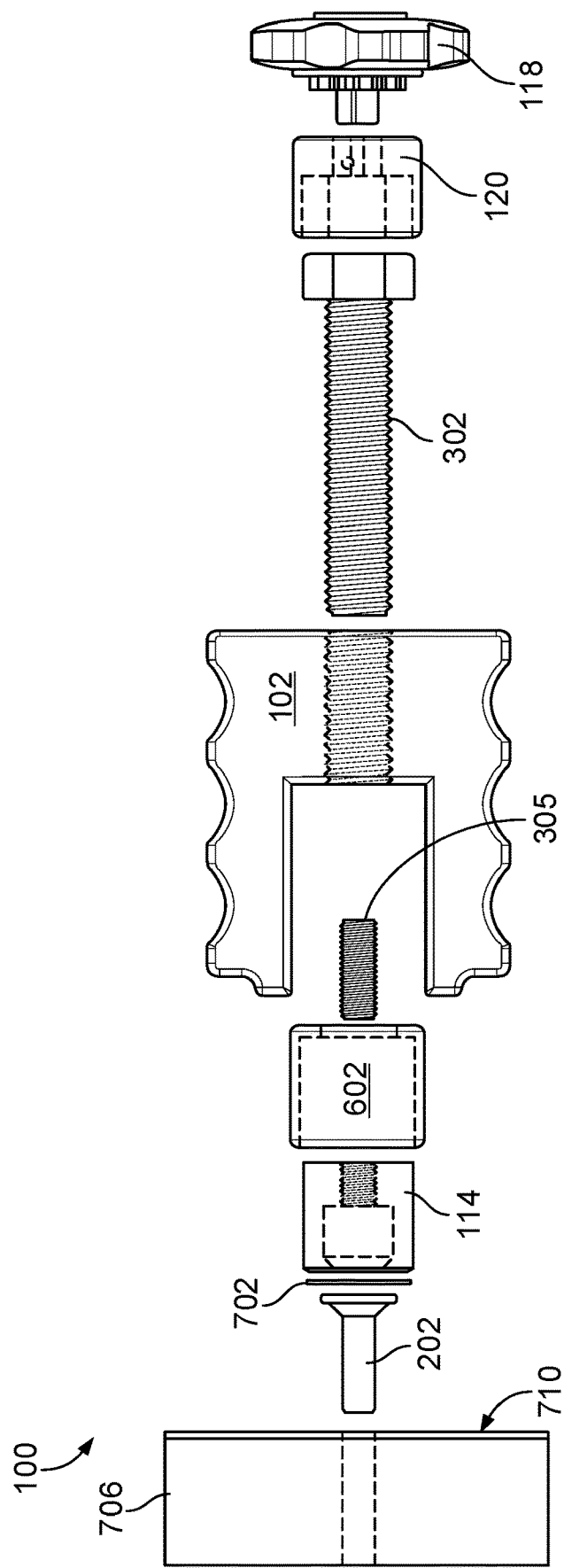
FIG. 7 is an exemplary block diagram illustrating an exploded view of a pin pulling tool including a closure sleeve.

FIG. 7 is an exemplary block diagram illustrating an exploded view of a pin pulling tool 100 including a closure sleeve 602. The pin pulling tool 100 in this example includes a rotational end-piece 118 at one end of the tool which can be turned or rotated by the user either clockwise or counterclockwise. The rotational end-piece is optionally connected to a socket 120 disposed over the head of the threaded bolt 302. The threaded bolt 302 fits within a threaded hole (shown in FIG. 8 below) through the tool body 102. A threaded stud 305 connects the threaded bolt 302 to the fitting 114. The fitting 114 may be a removable or interchangeable fitting. The closure sleeve 602 is configured to slide over the fitting, enclosing the fitting and the head of the pin 202 during the pin removal operation. As the fitting is raised, the pin is pulled from the workpiece 706. The closure sleeve in the closed position prevents the fitting from sliding off the pin head until the user raises the closure sleeve.

A coupler interface barrier 702 is associated with an exterior surface of the fitting 114 coming into contact with an exterior surface 710 of the workpiece 706. The coupler interface barrier 702 providing a scratch-resistant padding across a surface of the fitting contacting the workpiece 706 to prevent scratching, marring, or other damage to the structure. The coupler interface barrier 702 can be implemented using a scratch-resistant padding composed of nylon, shot peen tape, or any other scratch-resistant material, for example. The padding in some examples includes a single pad, as well as two or more layers of padding compressed or stacked together.

Figure 8:
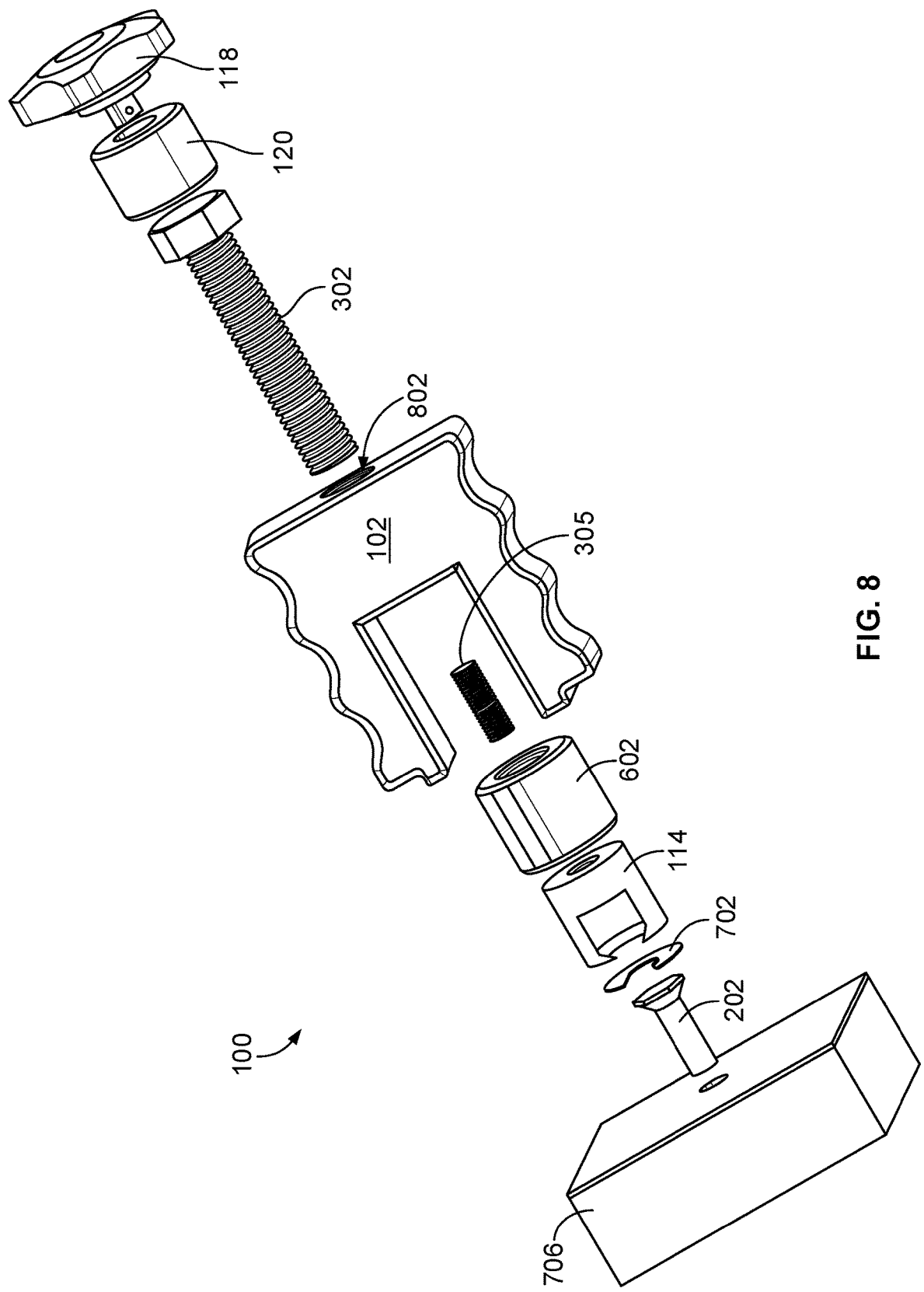
FIG. 8 is an exemplary block diagram illustrating an exploded view of a pin puller assembly including a closure sleeve.

FIG. 8 is an exemplary block diagram illustrating an exploded view of a pin puller assembly including a closure sleeve 602. In this non-limiting example, the rotational end-piece 118 and socket 120 engage a threaded bolt 302 which fits within a threaded hole 802 running vertically through the inside the tool body 102. The threaded hole 802 has a diameter approximately equal to the diameter of the threaded shaft of the threaded bolt such that at least a portion of the threaded bolt is configured to thread through the threaded hole 802.

A threaded stud 305 removably attaches the fitting 114 to the end of the threaded bolt 302. As the threaded bolt turns, it raises the fitting 114 which simultaneously lifts the pin 202 from the workpiece 706. The coupler interface barrier 702 provides a scratch-resistant padding or other surface preventing damage to the workpiece 706.

The tool body 102 is not limited to the size or shape shown in the examples. In this example, the tool body 102 includes a flat exterior surface. In other examples, the tool body 102 is a generally cylindrical body having a bore therein (not shown). The interface surface includes an annular surface proximate the bore opening. The term annular refers to a ring-shape, circular shape, or substantially rounded shape.

The threaded hole extends axially through the cylindrically shaped body and into the bore. The term axially refers to the axis or central portion of the body. In still other examples, the tool body 102 is oblong, ovoid, rectangular, spherical, or any other suitable shape. The tool body 102 is not limited to the size or shape shown in the examples.

Figure 9:
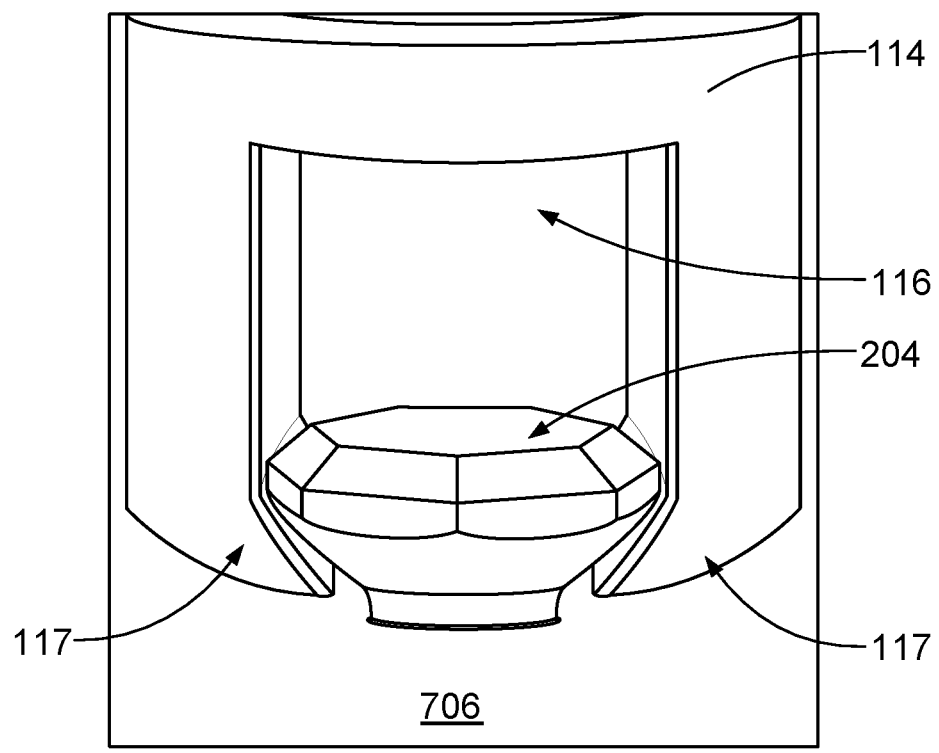
FIG. 9 is an exemplary block diagram illustrating a pin puller tool fitting positioned over a head of a pin.

FIG. 9 is an exemplary block diagram illustrating a fitting of a pin pulling tool 100 positioned over a head 204 of a pin, such as pin 202 in FIG. 2. In some examples, the fitting 114 coupled to the end of the tool body slides over the head 204 of the pin. The keyhole-slot 116 is configured to receive the head of the pin. In other words, the keyhole-slot is sized and shaped such that the head of the pin fits through the keyhole slot.

The keyhole-slot 116 defines a set of spaced-apart jaws 117 configured to engage the head 204 of the pin received within the keyhole-slot 116. The set of spaced-apart jaws 117 includes one or more jaws. In some examples, the set of spaced-apart jaws 117 include two opposing jaws. In other examples, the set of jaws 117 includes a single jaw which project inward along the circumference of the bottom edge of the fitting. In still other examples, the set of jaws includes a single jaw, as well as two or more jaws. In this example, the set of spaced-apart jaws 117 includes a pair of two spaced-apart jaws. In other examples, the set of spaced-apart jaws 117 includes a single half-circle jaw configured to slide beneath at least a portion of the underside of the head of the pin between the workpiece surface and the pinhead. In still other examples, the set of spaced-apart jaws 117 includes a set of three or more jaws or teeth which fit between the workpiece surface and the underside of the pin head to pull the pin head upward away from the workpiece.

The set of spaced-apart jaws 117 are configured to slide around the head 204 of the pin and sit beneath a portion of the head of the pin, between the head of the pin and the workpiece exterior surface. As the fitting is raised by the rotating threaded screw, the jaws pull the head of the pin in an upward motion along the y-axis to lift or pull the fastener pin out of the workpiece 706.

Figure 10:
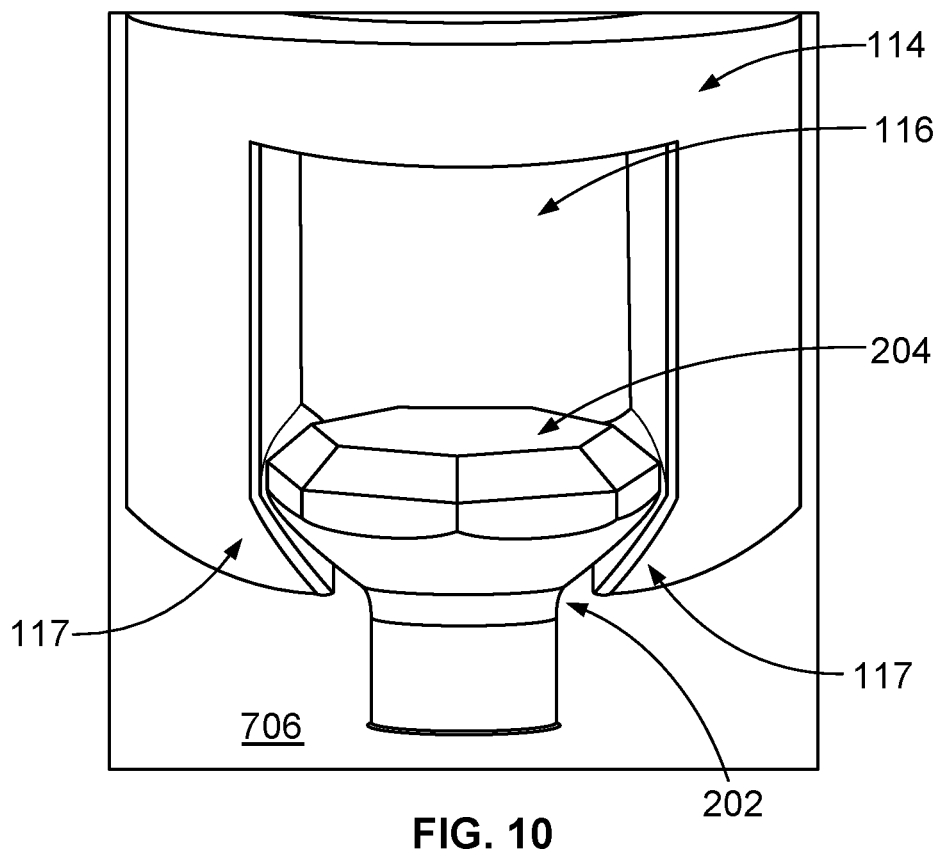
FIG. 10 is an exemplary block diagram illustrating the pin puller tool fitting raising and removing the pin from a workpiece.

FIG. 10 is an exemplary block diagram illustrating the fitting 114 of pin pulling tool 100 raising and partially removing the pin 202 from a workpiece 706. Turning a rotational end-piece of the pin pulling tool raises the height of the fitting 114. The one or more jaws in the set of spaced-apart jaws 117 sitting beneath the head 204 exerts force to pull the head of the pin received within the keyhole-slot 116. In this example, the pin is partially removed from the workpiece 706.

Figure 11:
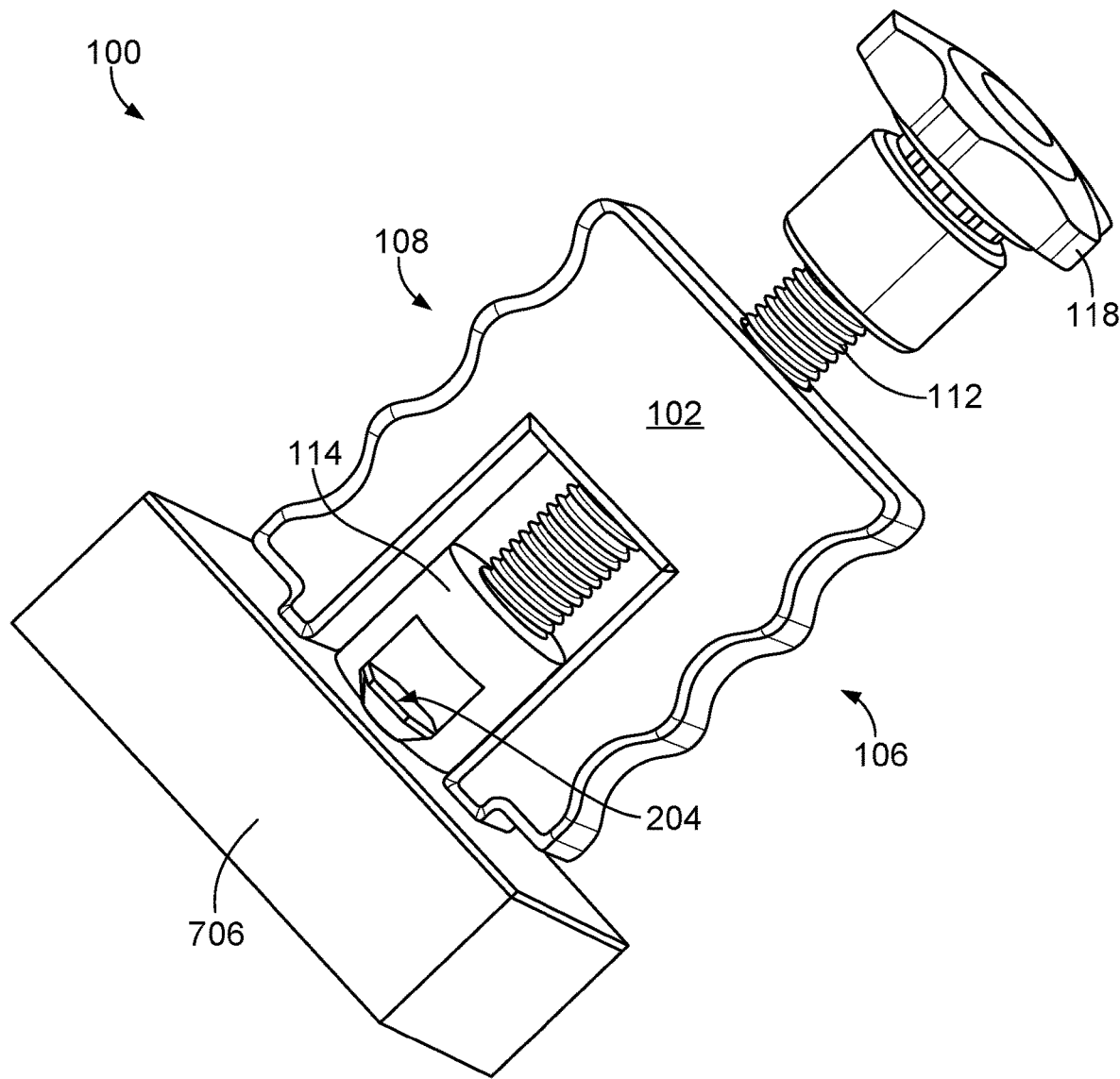
FIG. 11 is an exemplary block diagram illustrating an isometric view of a pin puller tool engaging the head of a pin secured within a workpiece.

FIG. 11 is an exemplary block diagram illustrating an isometric view of a pin pulling tool 100 engaging the head 204 of a pin secured within a workpiece 706. In this example, as the rotational end-piece 118 is turned, the threaded screw 112 rotates within the tool body 102 to raise the fitting 114 and pull the pin head 204. The user can optionally grip the tool body along the contoured side edges 106 and/or 108 of the tool body 102 during pin removal for additional stability.

Figure 12:
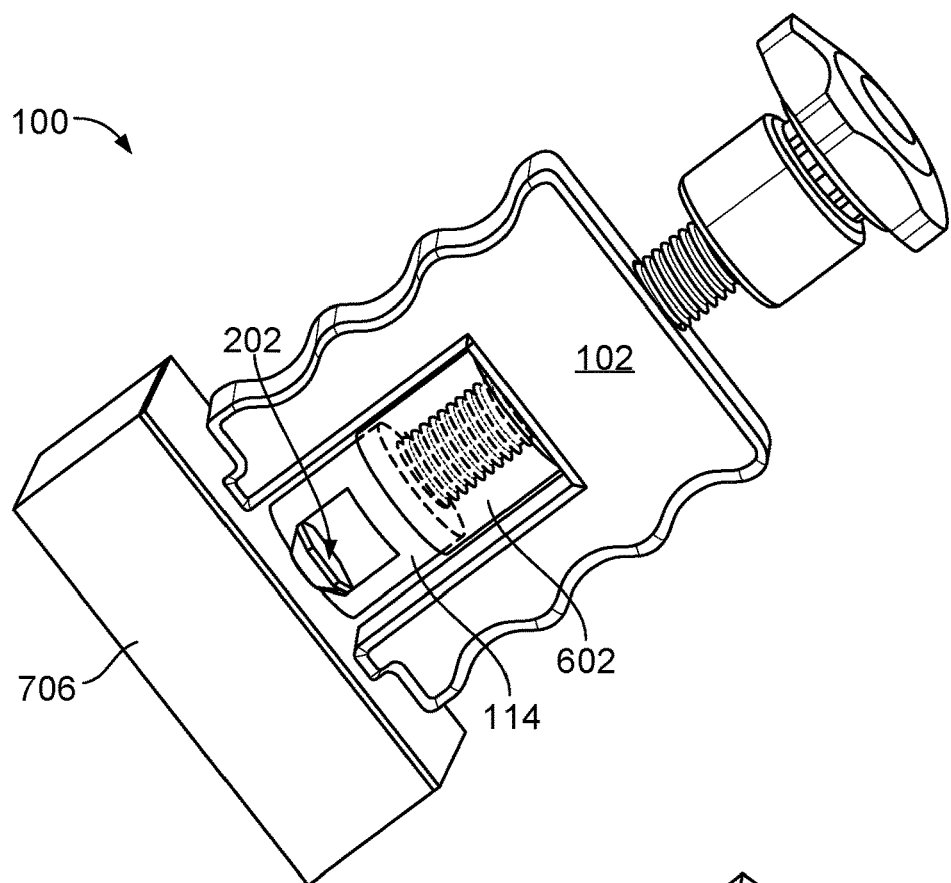
FIG. 12 is an exemplary block diagram illustrating a pin puller tool having a closure sleeve in a raised position.

FIG. 12 is an exemplary block diagram illustrating a pin pulling tool 100 having a closure sleeve 602 in a raised position. In this example, the fitting 114 sits flush against the workpiece 706, with the jaws of the fitting 114 wedged beneath the head of the pin 202, which is at least partially embedded within the workpiece 706. The closure sleeve 602 is in the open position in which the sleeve is positioned above the fitting 114. The user's view of the pin 202 head within the keyhole-slot 116 of the fitting is unobstructed by the closure sleeve 602 as it is shown in the open position.

Figure 13:
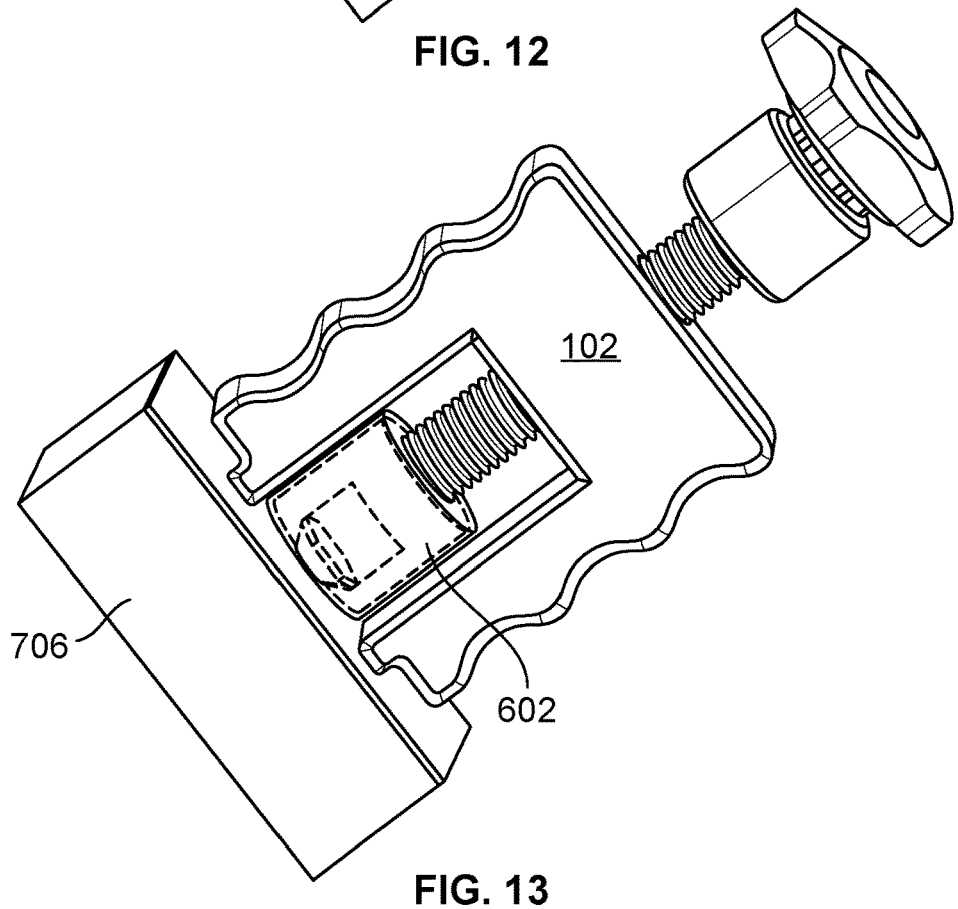
FIG. 13 is an exemplary block diagram illustrating a pin puller tool having the closure sleeve in the lowered position.

FIG. 13 is an exemplary block diagram illustrating a pin pulling tool 100 having the closure sleeve 602 in the lowered position. The closure sleeve 602 is lowered or slides downward over the fitting 114. The tool body 102 is seated flush against the workpiece 706 exterior surface. The closure sleeve 602 in the closed position encloses the fitting and the head of the pin that is received within the keyhole-slot of the fitting to prevent the fitting from sliding off the head of the pin during removal of the pin from the workpiece 706. The pin, pin head, fitting and keyhole slot are not visible in this example as these elements are enclosed within the closure sleeve 602 in the closed position.

In some examples, the tool body includes threaded hole that extends in a direction normal to the workpiece 706 interface surface, such that the threaded screw 112 is configured to be oriented generally perpendicular to the workpiece 706 surface in which a pin is installed. In other words, the orientation of the threaded screw 112 is perpendicular to the workpiece in some examples. The pin is at least partially installed within the workpiece by being inserted into, screwed into, inserted into, or otherwise partially embedded within at least a portion of the workpiece.

Figure 14:
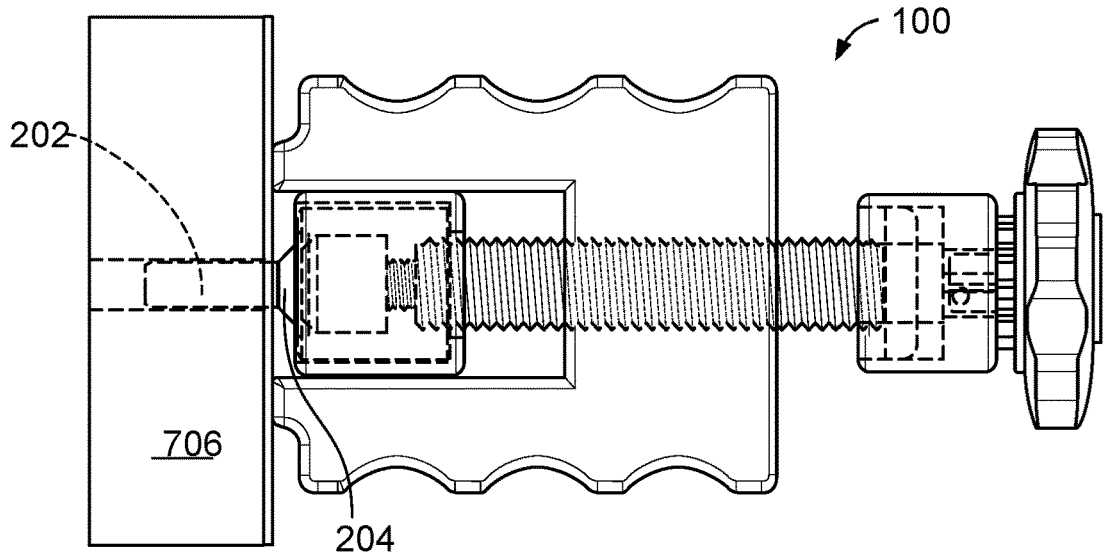
FIG. 14 is an exemplary block diagram illustrating a pin puller tool engaging a pin within a workpiece for removal of the pin.

FIG. 14 is an exemplary block diagram illustrating a pin pulling tool 100 engaging a pin within a workpiece 706 for removal of the pin 202. In this example, the fitting is engaged over the head 204 of the pin. If present, the closure sleeve is lowered over the fitting to secure the pin within the fitting.

Figure 15:
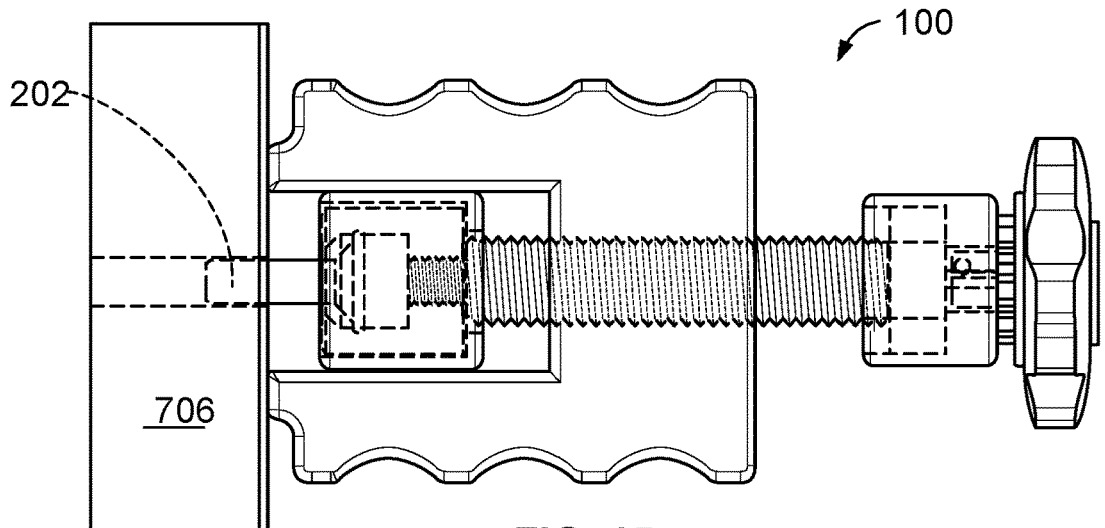
FIG. 15 is an exemplary block diagram illustrating a pin puller tool partially removing a pin from a workpiece.

FIG. 15 is an exemplary block diagram illustrating a pin pulling tool 100 partially removing a pin from a workpiece 706. In this example, the pin 202 has been partially removed from the workpiece 706.

Figure 16:
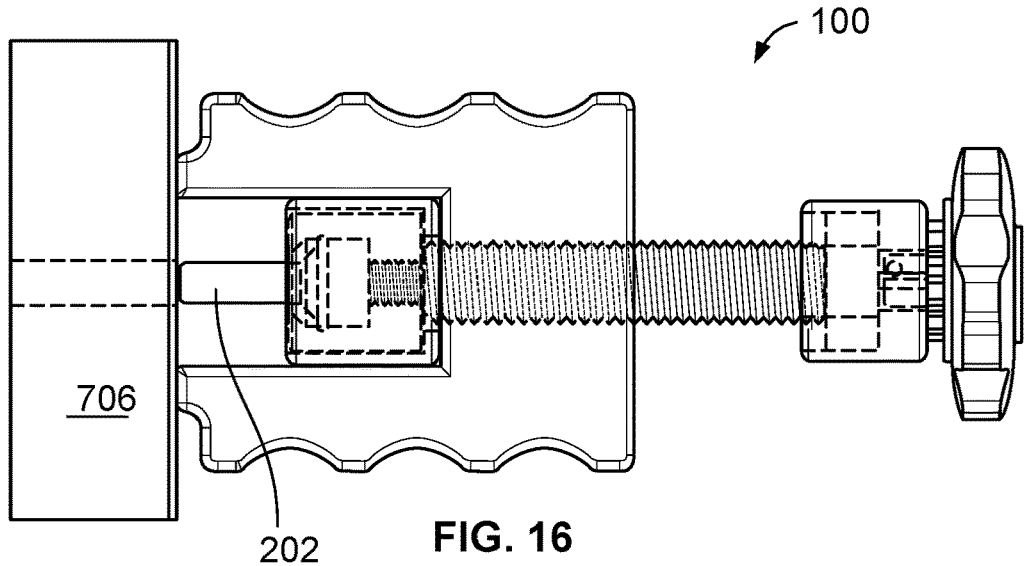
FIG. 16 is an exemplary block diagram illustrating a pin puller tool with extracted pin.

FIG. 16 is an exemplary block diagram illustrating a pin pulling tool 100 with extracted pin 202. In this example, the pin puller tool has completely removed the pin from the workpiece 706. The head of the pin is still engaged within the fitting. The user can slide the fitting off the head of the pin to remove the pin from the pin pulling tool.

Figure 17:
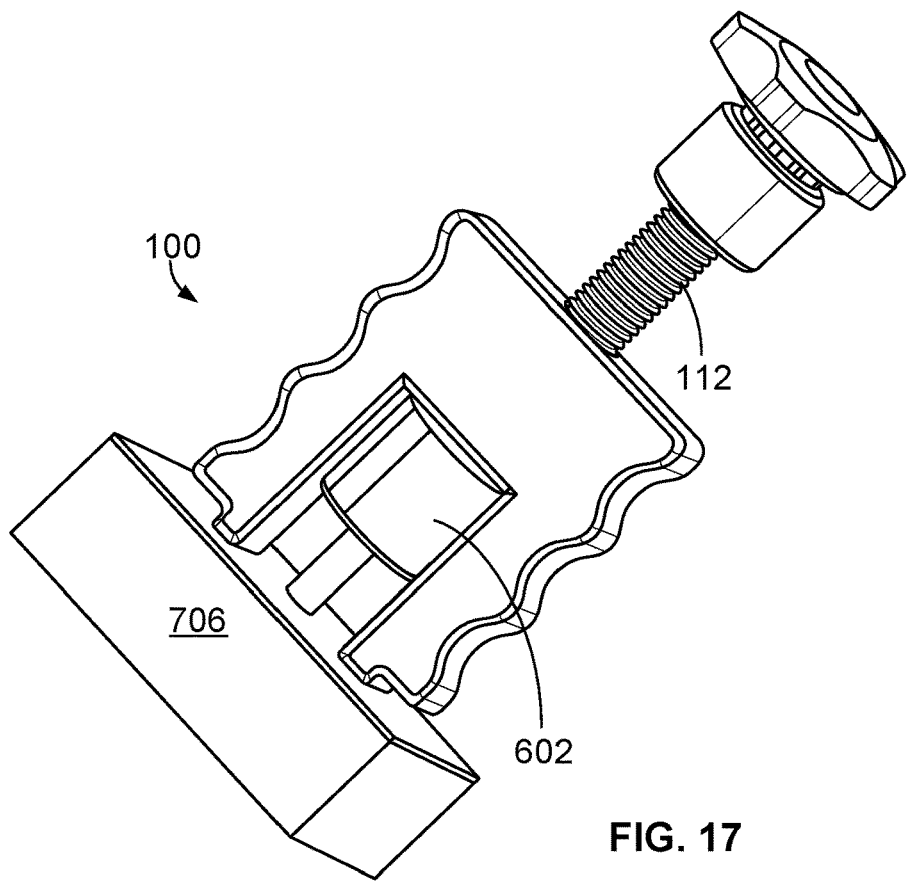
FIG. 17 is an exemplary block diagram illustrating an extracted pin puller tool assembly with a closure sleeve.

FIG. 17 is an exemplary block diagram illustrating an extracted pin pulling tool 100 assembly with a closure sleeve 602. In some examples, the workpiece interface surface is configured to seat against a surface of the workpiece 706. The workpiece interface surface provides leverage support for the threaded screw 112 that rotates and pulls the fitting and pin head away from the workpiece 706.

Figure 18:
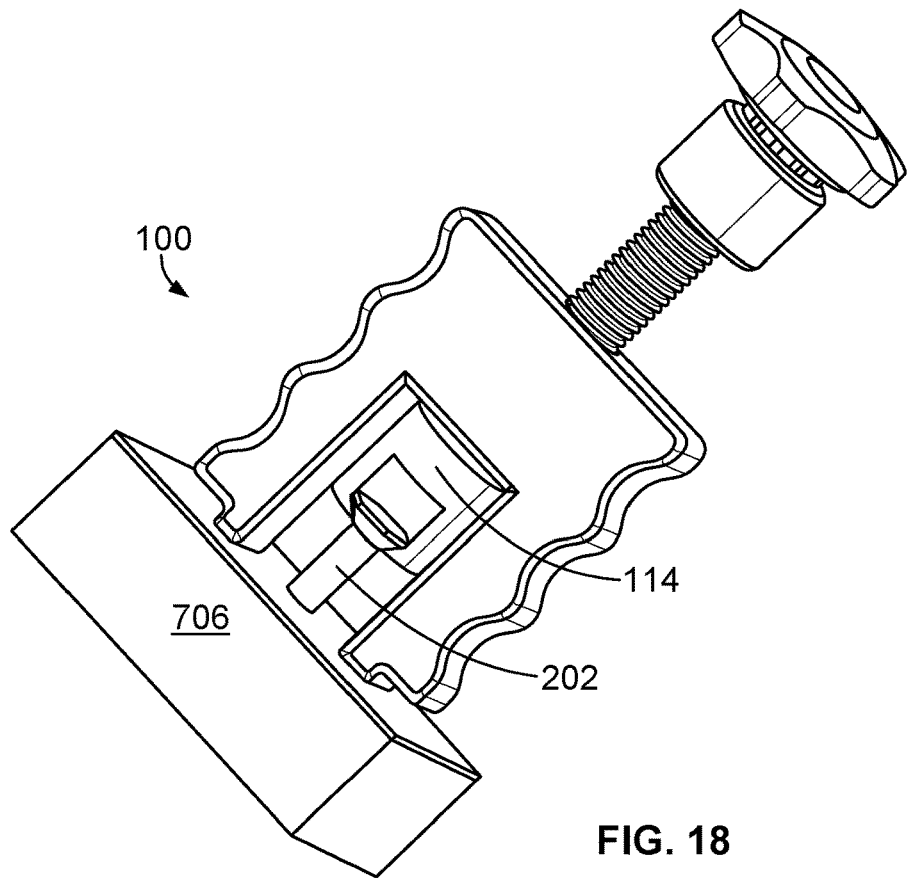
FIG. 18 is an exemplary block diagram illustrating an extracted pin puller tool assembly without the closure sleeve.

FIG. 18 is an exemplary block diagram illustrating an extracted pin pulling tool 100 assembly without the closure sleeve. In this example, the view of the pin 202 within the pin puller tool is unobstructed as the fitting 114 pulls the pin 202 from the workpiece 706.

Figure 19:
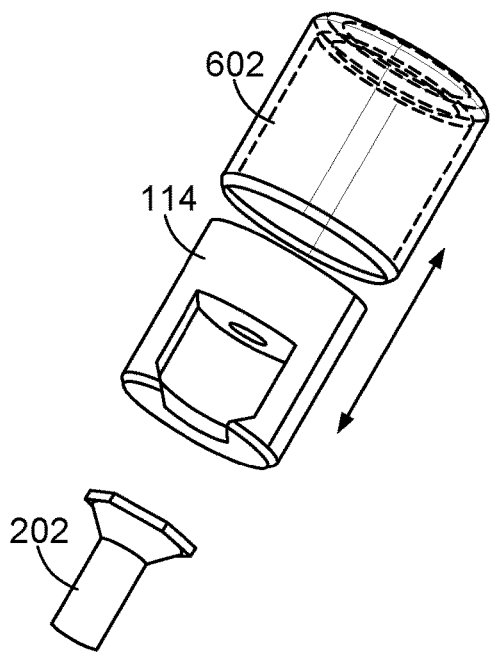
FIG. 19 is an exemplary block diagram illustrating a closure sleeve and fitting.

FIG. 19 is an exemplary block diagram illustrating a closure sleeve 602 and the fitting 114. The closure sleeve is sized to fit over the fitting and/or the pin 202 at least partially enclosed inside the fitting 114. The closure sleeve encloses the pin head inside the fitting to prevent the pin from sliding through the keyhole slot during pin removal.

The closure sleeve 602 sits in a position above the fitting when not in use. The closure sleeve 602 in this example is a cylindrical shape configured to encase the fitting in a closed position and expose the key-hole structure in an open position. However, the closure sleeve is not limited to a cylindrical shape. In other examples, the closure sleeve 602 may be implemented as a flap or arm that lowers down to wholly or partially block the keyhole slot while in the closed position. In still other examples, the closure sleeve 602 can be implemented as a clamp, clip, tab, or other sliding member that slides down to completely or partially block the keyhole slot defined by the pin fitting 114.

Figure 20:
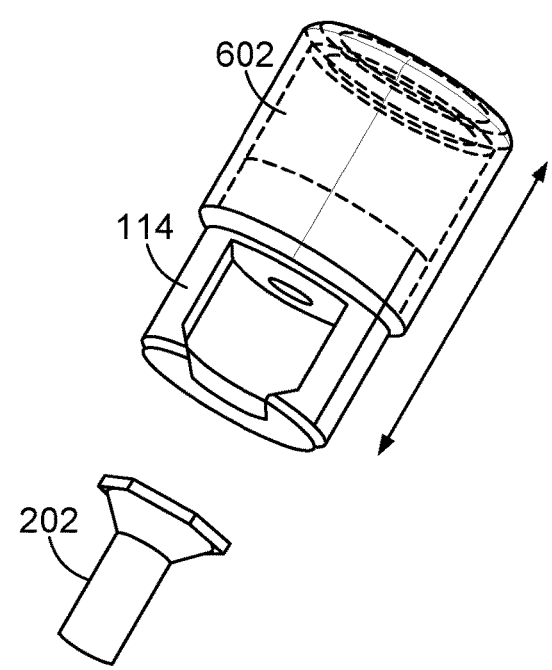
FIG. 20 is an exemplary block diagram illustrating a closure sleeve partially sliding over a fitting.

FIG. 20 is an exemplary block diagram illustrating a closure sleeve 602 partially sliding over a fitting 114. The closure sleeve 602 slides up to expose the keyhole slot and slides downward to enclose the fitting during pin 202 removal. In this example, the closure sleeve 602 is non-removable. In the open position, the closure sleeve 602 slides upward providing user access to the keyhole slot. In other non-limiting examples, the closure sleeve 602 is a removable piece which can snap over the keyhole slot or otherwise removably couple to the fitting to at least partially enclose the fitting in the closed position.

Figure 21:
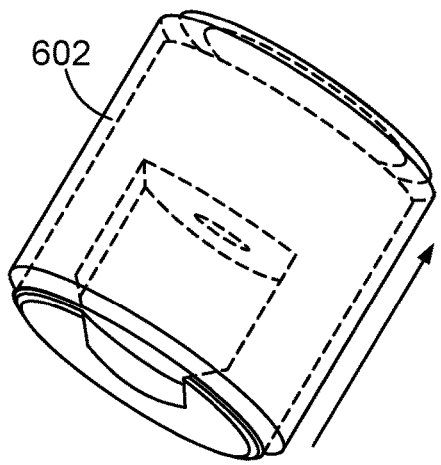
FIG. 21 is an exemplary block diagram illustrating a closure sleeve enclosing a fitting.

FIG. 21 is an exemplary block diagram illustrating a closure sleeve 602 enclosing the fitting 114. The fitting is completely enclosed by the closure sleeve in this example.

Figure 22:
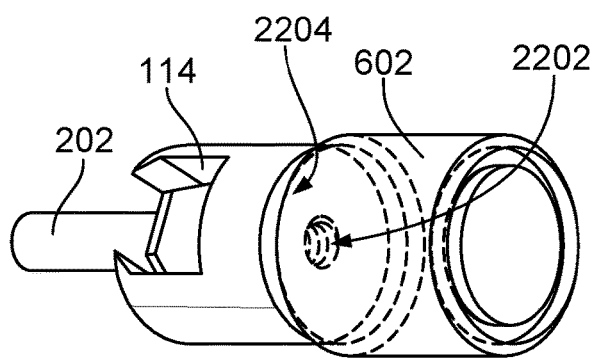
FIG. 22 is an exemplary block diagram illustrating a closure sleeve partially sliding over a fitting engaging a pin head.

FIG. 22 is an exemplary block diagram illustrating a closure sleeve 602 partially sliding over a fitting engaging a pin 202 head. The closure sleeve 602 encloses the head of the pin 202 inside the fitting to prevent the pin 202 from sliding through the keyhole slot during pin removal. The fitting includes a threaded bore 2202 at the connection (distal) end 2204 of the pin fitting for coupling to a threaded stud, such as the threaded stud 305.

Figure 23:
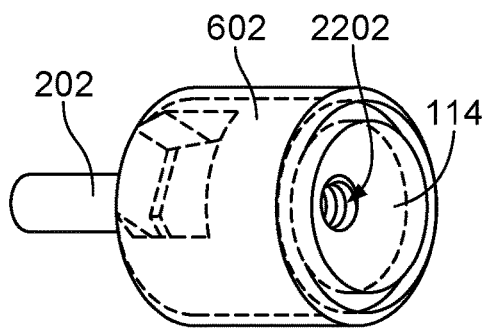
FIG. 23 is an exemplary block diagram illustrating a closure sleeve enclosing a fitting and pin head.

FIG. 23 is an exemplary block diagram illustrating a closure sleeve 602 enclosing the fitting 114 and pin 202 head. In the closed position, the pin 202 cannot slide out of the fitting during pin removal operations. The fitting 114 in some examples includes a threaded bore 2202 having a diameter sufficient to accommodate at least a portion of an end of a threaded stud, such as the threaded stud 305. The threaded stud couples the fitting to the threaded bolt or other threaded screw via the threaded bore 2202. In some examples, the threaded bore 2202 threads are opposing threads to the threaded bolt to prevent the threaded stud from disconnecting from the threaded bore when the rotational end-piece is engaged to rotate the threaded bolt or other threaded screw during pin removal procedures.

Figure 24:
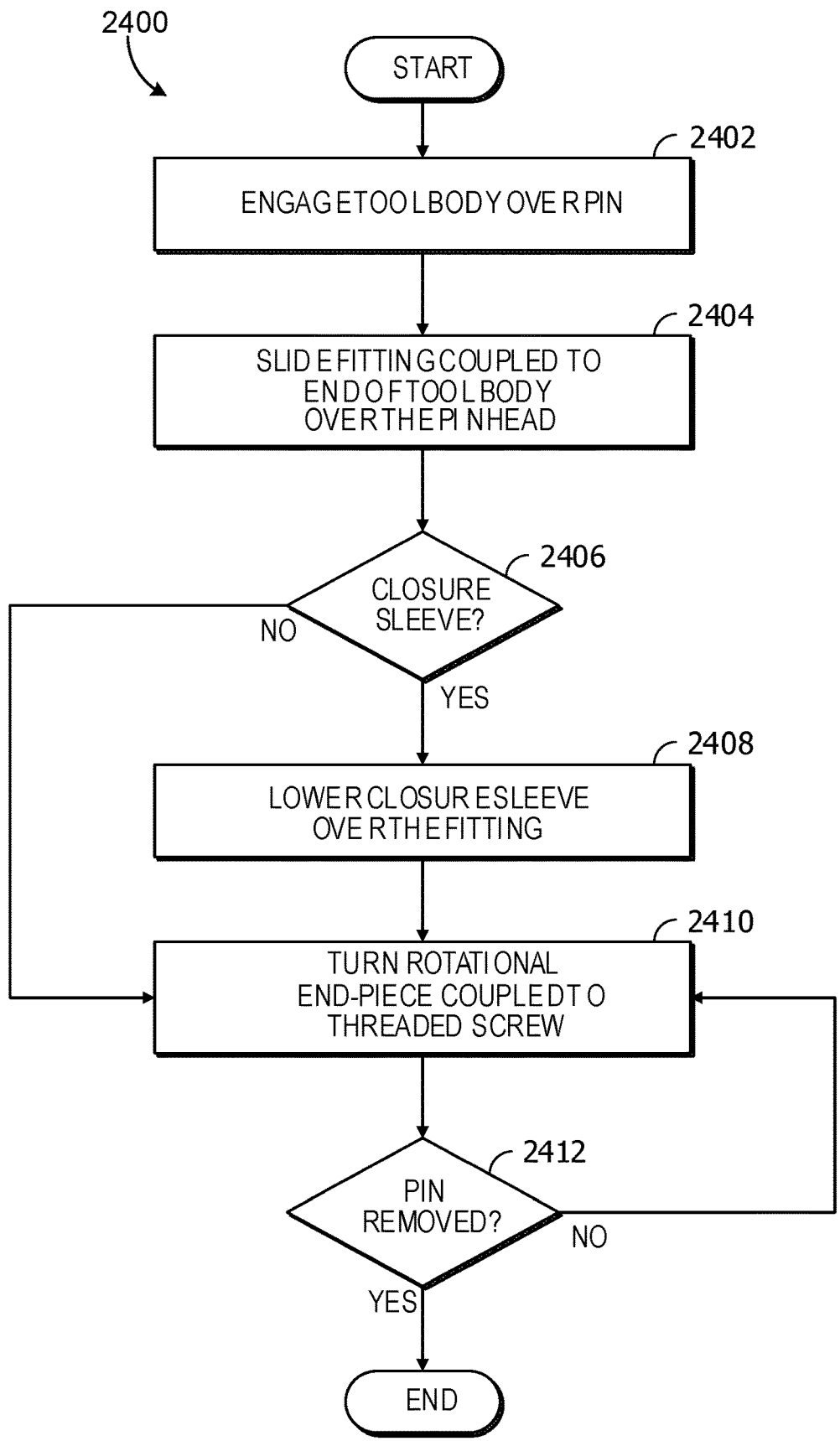
FIG. 24 is a flow chart 2400 illustrating an implementation of a pin pulling tool for removing a pin.

FIG. 24 is a flow chart 2400 illustrating an implementation of a pin pulling tool for removing a pin. The tool body engages over a pin head at operation 2402. A fitting coupled to the end of the tool body slides over a head of the pin at operation 2404. The fitting includes a keyhole-slot 116 configured to receive the head of the pin. The keyhole-slot defines a set of spaced-apart jaws configured to engage the head of the pin received within the keyhole-slot, such as, but not limited to, a pair of jaws. A determination is made whether a closure sleeve is present at 2406. If yes, the closure sleeve is lowered over the fitting to secure the pin inside the fitting at 2408. A rotational end-piece coupled to a threaded screw is turned at operation 2410. A determination is made whether the pin is removed at 2412. If no, the rotational end-piece is turned to raise the fitting until the pin is freed from the workpiece.

Figure 25:
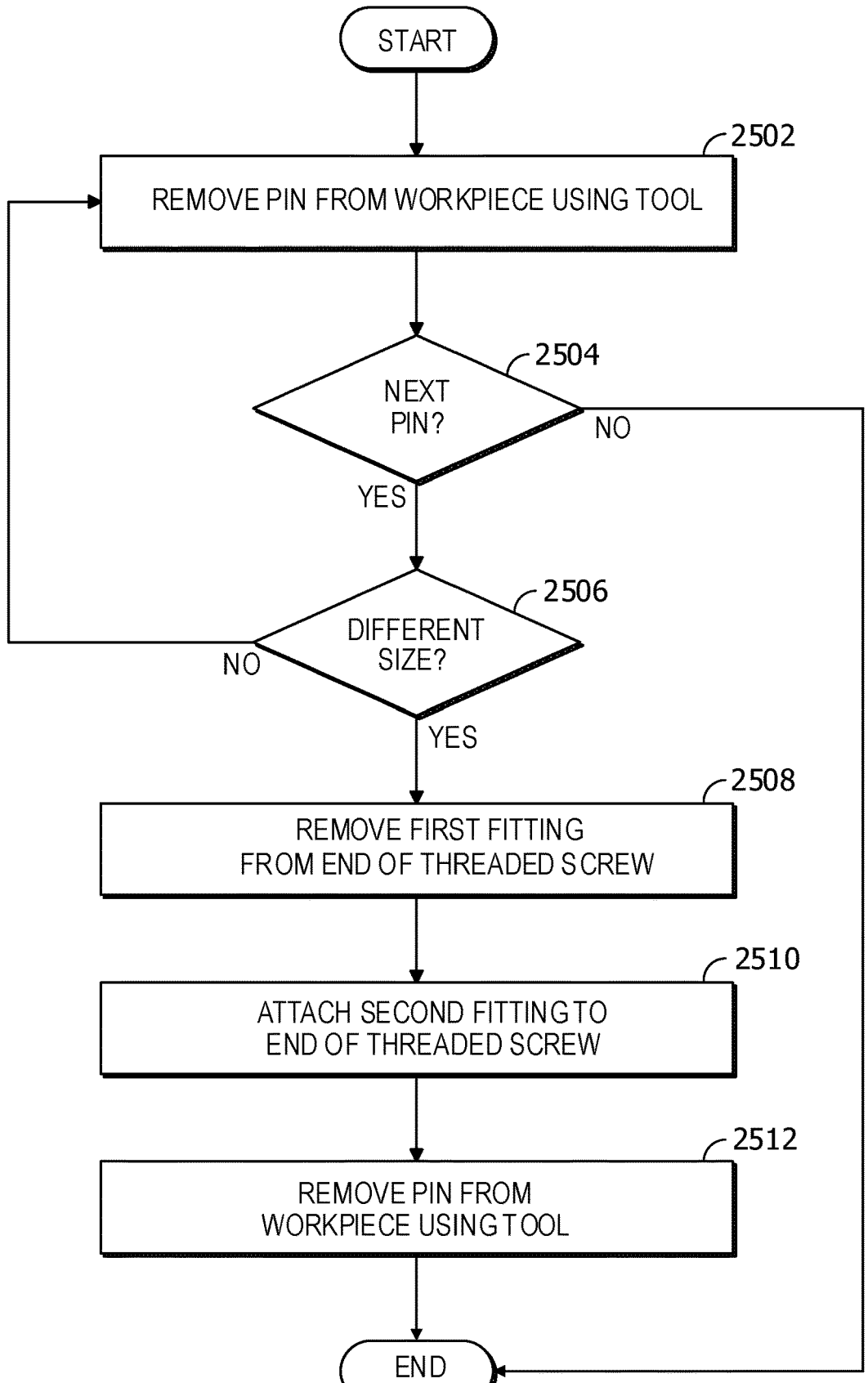
FIG. 25 is a flow chart 2500 illustrating an implementation of a modular pin pulling tool having interchangeable fittings for removal of variable size and variable shape pins.

FIG. 25 is a flow chart 2500 illustrating an implementation of a modular pin pulling tool having interchangeable fittings for removal of variable size and variable shape pins. A pin is removed from a workpiece using the modular pin pulling tool at 2502. A determination is made whether there is a next pin to remove at operation 2504. If yes, a determination is made whether the next pin is a different size at operation 2506. If yes, the first fitting is removed from the end of the threaded screw at operation 2508. A second fitting configured to fit the next pin is attached to the end of the threaded screw at operation 2510. The pin is removed from the workpiece using the modular pin pulling tool and the second interchangeable fitting at operation 2512.

Figure 26:
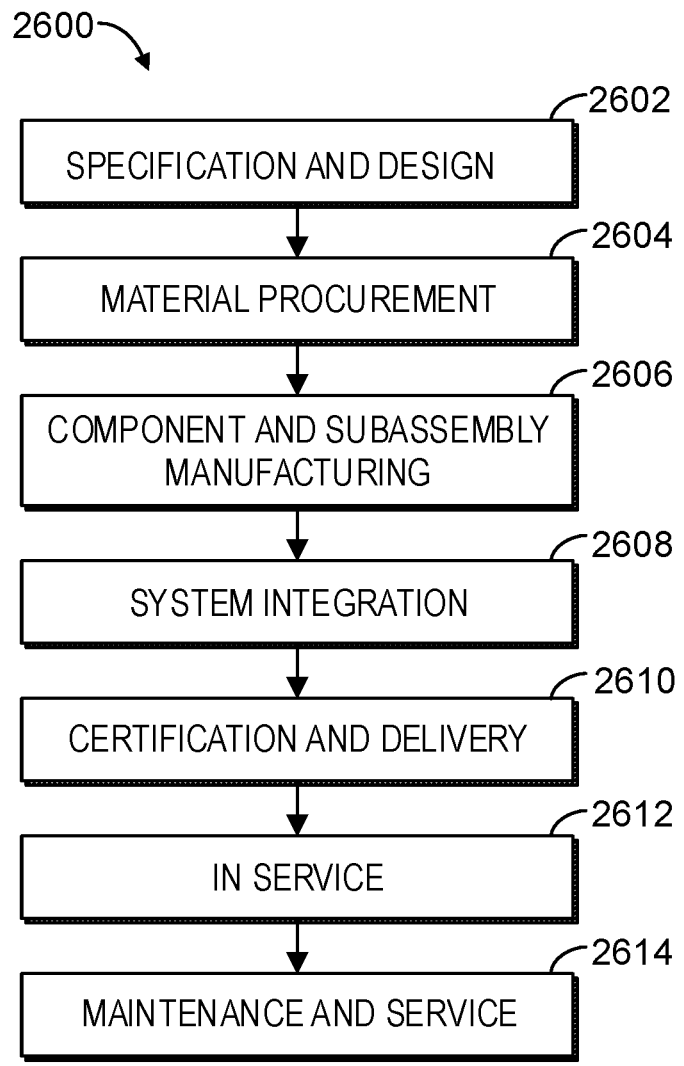
FIG. 26 is a block diagram of an apparatus of manufacturing and service method 2600 that advantageously employs the pin pulling tool.
Figure 27:
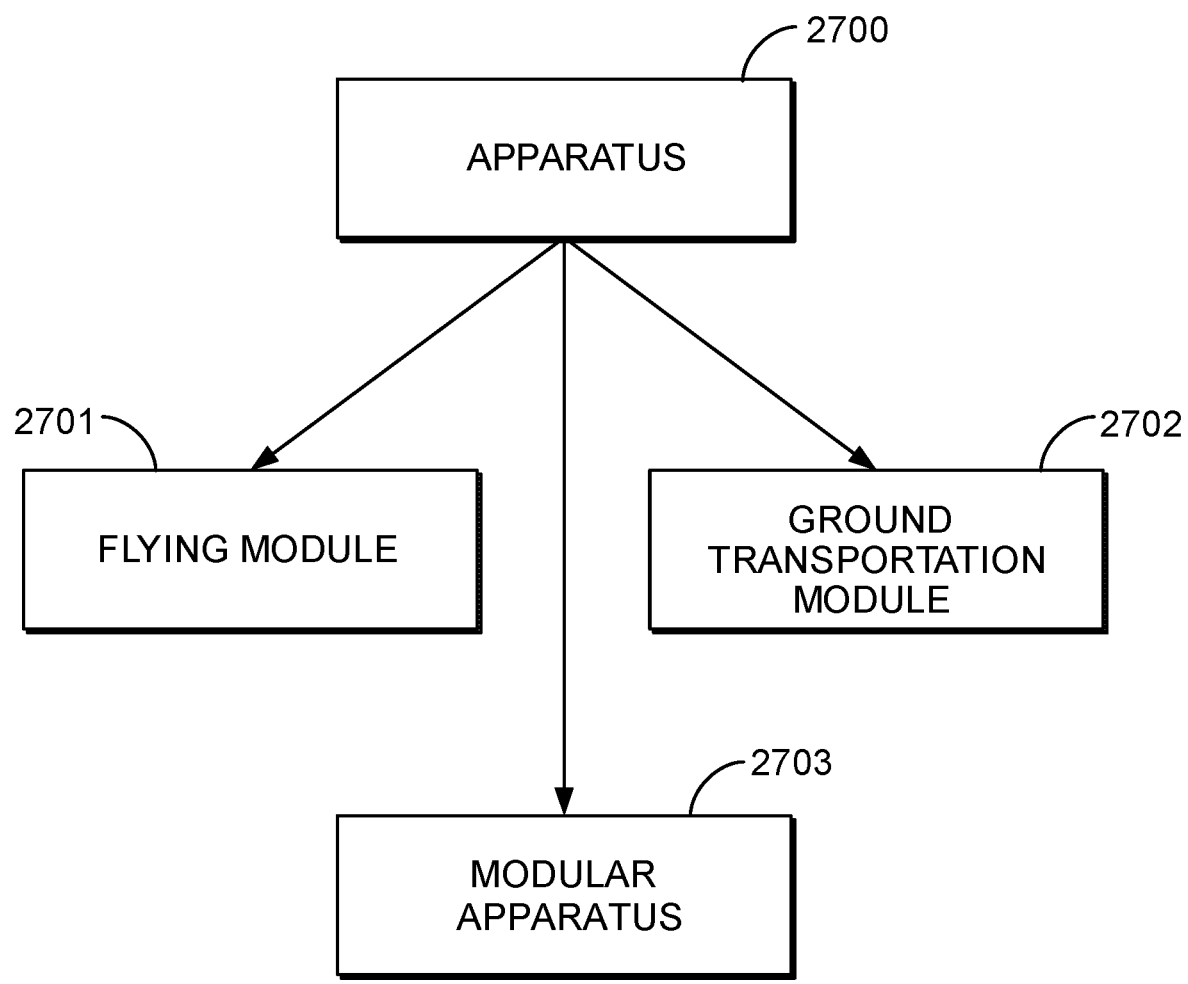
FIG. 27 is a block diagram of an apparatus 2700 that advantageously employs the pin pulling tool.
Figure 28:
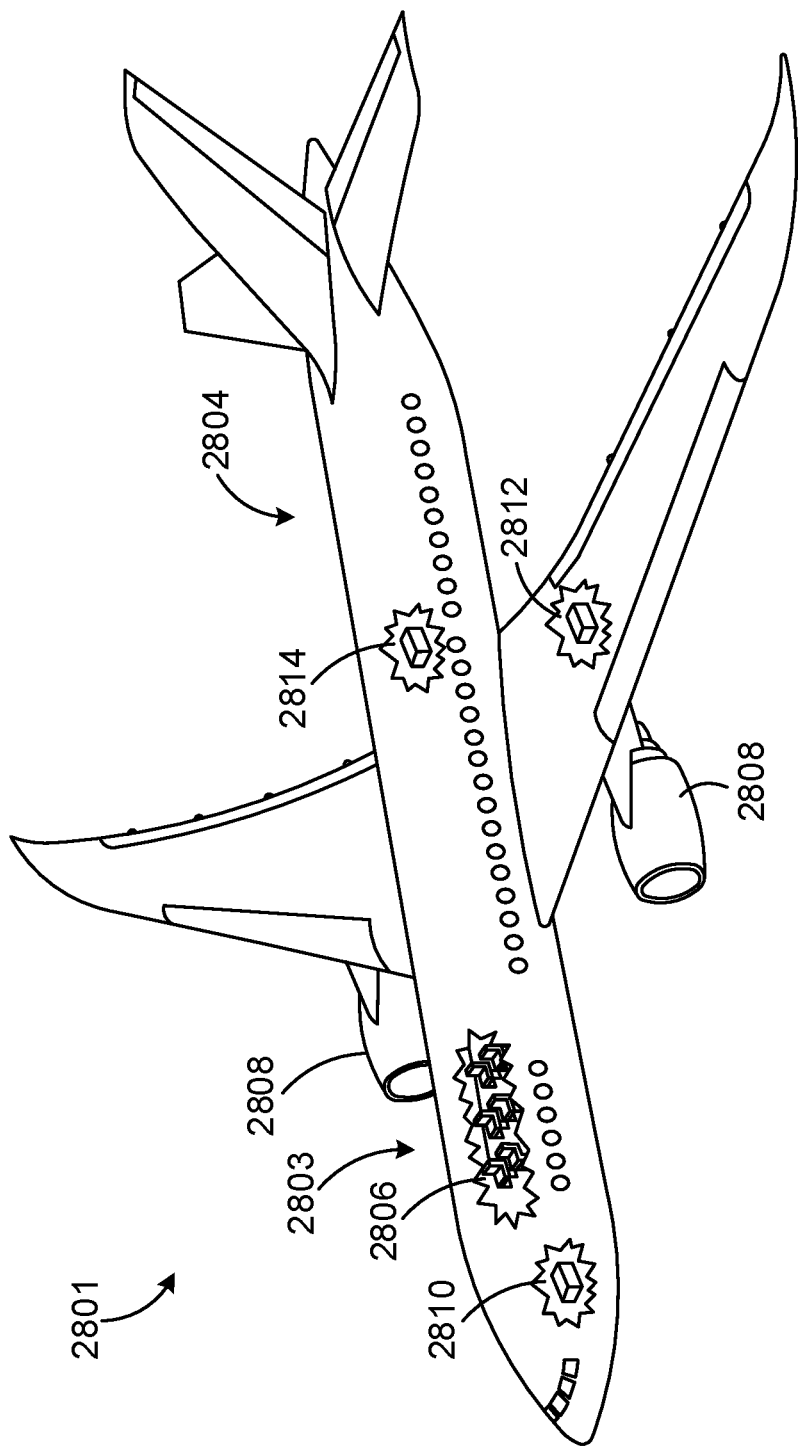
FIG. 28 is a schematic perspective view of a particular flying module 2801.

Some examples of the pin pulling tool (of FIG. 1) are used in manufacturing and service applications as shown and described in relation to FIGS. 26-28. Thus, implementations of the disclosure are described in the context of an apparatus of manufacturing and service method 2600 shown in FIG. 26 and apparatus 2700 shown in FIG. 27. In FIG. 26, a diagram illustrating an apparatus manufacturing and service method is depicted in accordance with an implementation. In one implementation, during pre-production, the apparatus manufacturing and service method 2600 includes specification and design 2602 of the apparatus 2700 in FIG. 27 and material procurement 2604. During production, component and subassembly manufacturing 2606 and system integration 2608 of the apparatus 2700 in FIG. 27 takes place. Thereafter, the apparatus 2700 in FIG. 27 goes through certification and delivery 2610 in order to be placed in service 2612. While in service by a customer, the apparatus 2700 in FIG. 27 is scheduled for routine maintenance and service 2614, which, in one implementation, includes modification, reconfiguration, refurbishment, and other maintenance or service described herein.

In one implementation, each of the processes of the apparatus manufacturing and service method 2600 are performed or carried out by a system integrator, a third party, and/or an operator. In these implementations, the operator is a customer. For the purposes of this description, a system integrator includes any number of apparatus manufacturers and major-system subcontractors; a third party includes any number of venders, subcontractors, and suppliers; and in one implementation, an operator is an owner of an apparatus or fleet of the apparatus, an administrator responsible for the apparatus or fleet of the apparatus, a user operating the apparatus, a leasing company, a military entity, a service organization, or the like.

With reference now to FIG. 27, the apparatus 2700 is provided. As shown in FIG. 27, an example of the apparatus 2700 is a flying apparatus 2701, such as an aerospace vehicle, aircraft, air cargo, flying car, and the like. As also shown in FIG. 27, a further example of the apparatus 2700 is a ground transportation apparatus 2702, such as an automobile, a truck, heavy equipment, construction equipment, a boat, a ship, a submarine and the like. A further example of the apparatus 2700 shown in FIG. 27 is a modular apparatus 2703 that comprises at least one or more of the following modules: an air module, a payload module and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

With reference now to FIG. 28, a more specific diagram of the flying apparatus 2701 is depicted in which an implementation of the disclosure is advantageously employed. In this example, the flying apparatus 2701 is an aircraft produced by the apparatus manufacturing and service method 2600 in FIG. 26 and includes an airframe 2803 with a plurality of systems 2804 and an interior 2806. Implementations of the plurality of systems 2804 include one or more of a propulsion system 2808, an electrical system 2810, a hydraulic system 2812, and an environmental system 2814. However, other systems are also candidates for inclusion. Although an aerospace example is shown, different advantageous implementations are applied to other industries, such as the automotive industry, etc.

The following paragraphs describe further aspects of the disclosure:

A1. A pin pulling tool, comprising:
a tool body having a workpiece interface surface, a threaded hole and opposing side edges having a plurality of contoured recesses arranged to generally align with one or more fingers of a user to enable the user to apply a firm grasp or otherwise grip a portion of the tool body;
a threaded screw, disposed in and rotatable relative to the threaded hole in the tool body;
a fitting coupled to the end of the threaded screw that is proximate the workpiece interface surface, the fitting having a keyhole-slot configured to receive the head of a pin, where the keyhole-slot defines a pair of spaced-apart jaws configured to engage the head of the pin that is received within the keyhole-slot; and
a rotational end-piece coupled to the threaded screw, configured to rotate and displace the threaded screw relative to the tool body to cause the fitting and the pair of spaced-apart jaws to pull the head of the pin received within the keyhole-slot, to thereby remove the pin from a workpiece.

A2. The pin pulling tool of claim 1, wherein the threaded screw is a bolt having a threaded shaft member and a drive head, and wherein the rotational end-piece is coupled to the threaded screw by a socket disposed on the drive head of the bolt.

A3. The pin pulling tool of claim 2, wherein a distal end of the bolt comprises a threaded housing, wherein the distal end of the bolt is coupled to the fitting by a threaded stud at least partially coupled to the threaded housing at a first end and coupled to the fitting at a second end.

A4. The pin pulling tool of claim 1, wherein the workpiece interface surface is configured to seat against a surface of a workpiece and provides leverage support for the threaded screw that rotates and pulls the fitting and pin head away from the workpiece.

A5. The pin pulling tool of claim 1, wherein the threaded hole extends in a direction normal to the workpiece interface surface, such that the threaded screw is configured to be oriented generally perpendicular to the workpiece surface in which a pin is at least partially installed.

A6. The pin pulling tool of claim 1, wherein the tool body comprises a plate having a notch, and the interface surface comprises first and second interface surfaces proximate the end of the notch, and wherein the threaded hole extends through the thickness of the plate and into the notch.

A7. The pin pulling tool of claim 1, wherein the tool body comprises a generally cylindrical body having a bore therein, the interface surface further comprising an annular surface proximate the bore opening, and the threaded hole extends axially through the cylindrical body and into the bore.

A8. The pin pulling tool of claim 1, further comprising:
a closure sleeve configured to encompass the fitting and the head of the pin that is received within the keyhole-slot of the fitting.

A9. The pin pulling tool of claim 1, further comprising:
a coupler interface barrier associated with an exterior surface of the fitting coming into contact with an exterior surface of the workpiece, the coupler interface barrier providing a scratch-resistant padding across a surface of the fitting contacting the workpiece.

A10. The pin pulling tool of claim 1, wherein the fitting is removably coupled to the end of the threaded screw, and further comprising:
a plurality of fittings wherein each fitting comprises a keyhole-slot configured to receive the head of a pin in a plurality of pins having a plurality of different pin sizes and pinhead shapes, wherein the pin pulling tool is modular, and wherein each fitting is configured to interchangeably couple to the pin pulling tool.

A11. The pin pulling tool of claim 1, wherein the fitting is coupled to the end of the threaded screw by at least one of welding, bonding or a press-fit.

A12. The pin pulling tool of claim 1, wherein the rotational end-piece further comprises an integrated socket configured to removably couple to the drive head of the bolt.

A13. The pin pulling tool of claim 1, further comprising:
a chamfer associated with the fitting, wherein the chamfer minimizes sharp edges associated with the interface between the fitting and the workpiece.

A14. A method of pin fastener removal using a pin removal tool, the method comprising:
engaging a tool body over a pin, wherein the tool body comprises a workpiece interface surface and opposing side edges having a plurality of contoured recesses configured to generally align with one or more fingers of a user to enable the user to grasp the tool body with a head of the pin partially inserted into a workpiece;
sliding a fitting coupled to the end of the tool body over a head of the pin, wherein the fitting comprises a keyhole-slot configured to receive the head of the pin, where the keyhole-slot defines a pair of spaced-apart jaws configured to engage the head of the pin received within the keyhole-slot; and
turning a rotational end-piece coupled to a threaded screw to rotate and displace the threaded screw relative to the tool body to cause the fitting to pull the head of the pin received within the keyhole-slot to thereby remove the pin from the workpiece.

A15. The method of claim 14, wherein the keyhole-slot defines a pair of spaced-apart jaws configured to engage the head of the pin, and further comprising:

sliding the pair of space-apart jaws beneath the head of the pin to grip the pin head of the pin within the fitting.

A16. The method of claim 15, further comprising:

lowering a closure sleeve over the fitting, wherein the closure sleeve encloses the fitting and the head of the pin that is received within the keyhole-slot of the fitting to prevent the fitting from sliding off the head of the pin during pin removal.

A17. The method of claim 14, wherein the fitting is a first fitting removably coupled to the end of a threaded screw, and further comprising:

removing the first fitting from the end of the threaded screw, wherein the first fitting comprises a first keyhole-slot conforming to a first pin having a first size head; and attaching a second fitting to the end of the threaded screw of the tool body, wherein the second fitting comprises a second keyhole-slot conforming to a second pin having a second size head.

A18. The method of claim 14, further comprising:

sliding a closure sleeve up into an open position to expose the fitting and the head of the pin that is received within the keyhole-slot of the fitting, wherein the closure sleeve prevents the fitting from sliding off the head of the pin during pin removal while in the closed position.

A19. The method of claim 14, further comprising:

turning the rotational end-piece in a clockwise or counter-clockwise direction to raise a height of the fitting within the tool body and pull the pin out of the workpiece.

A20. A modular pin pulling tool, comprising:

a tool body having a workpiece interface surface, a threaded hole and opposing side edges having a plurality of contoured recesses configured to generally align with fingers of a user to enable the user to apply a firm grasp to the tool body;

a threaded screw, disposed in and rotatable relative to the threaded hole in the tool body;

an interchangeable fitting removably coupled to the end of the threaded screw that is proximate the workpiece interface surface, the fitting having a keyhole-slot configured to receive the head of a pin, where the keyhole-slot defines a pair of spaced-apart jaws configured to engage the head of the pin that is received within the keyhole-slot;

a closure sleeve configured to encompass the fitting and the head of the pin that is received within the keyhole-slot of the fitting; and a rotational end-piece coupled to the threaded screw, configured to rotate and displace the threaded screw relative to the tool body to cause the fitting and the pair of spaced-apart jaws to pull the head of the pin received within the keyhole-slot, to thereby remove the pin from a workpiece.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A pin pulling tool, comprising:
    a tool body having a workpiece interface surface, a threaded hole and opposing side edges having a plurality of contoured recesses configured to generally align with at least one finger of a user to enable the user to grasp at least a portion of the tool body;
    a threaded screw, disposed in and rotatable relative to the threaded hole in the tool body;
    a fitting coupled to an end of the threaded screw that is proximate the workpiece interface surface, the fitting having a keyhole-slot configured to receive a head of a pin, where the keyhole-slot defines a set of spaced-apart jaws configured to engage the head of the pin that is received within the keyhole-slot; and
    a rotational end-piece coupled to the threaded screw, configured to rotate and displace the threaded screw relative to the tool body to cause the fitting and the set of spaced-apart jaws to pull the head of the pin received within the keyhole-slot, to thereby remove the pin from a workpiece.

2. The pin pulling tool of claim 1, wherein the threaded screw is a bolt having a threaded shaft and a drive head, and wherein the rotational end-piece is coupled to the threaded screw by a socket disposed on the drive head of the bolt.

3. The pin pulling tool of claim 2, wherein a distal end of the bolt comprises a threaded housing, wherein the distal end of the bolt is coupled to a threaded stud at least partially coupled to the threaded housing of the bolt at a first end of the threaded stud, and wherein the fitting is coupled to a second end of the threaded stud.

4. The pin pulling tool of claim 1, wherein the workpiece interface surface contacts at least a portion of a surface of the workpiece, wherein the threaded screw rotates and pulls the fitting and the head of the pin away from the workpiece.

5. The pin pulling tool of claim 1, wherein the threaded screw is generally perpendicular to at least a portion of the workpiece in which the pin is installed.

6. The pin pulling tool of claim 1, wherein the tool body comprises a plate having a notch, and the workpiece interface surface comprises a first interface surface and a second interface surfaces proximate to the notch, and wherein the threaded hole extends through at least a portion of the plate and into the notch.

7. The pin pulling tool of claim 1, wherein the tool body comprises a substantially cylindrical body having a bore therein, the workpiece interface surface further comprising an annular surface proximate the bore opening, and the threaded hole extends axially through the substantially cylindrical body and into the bore.

8. The pin pulling tool of claim 1, further comprising:
    a closure sleeve configured to encompass the fitting and the head of the pin that is received within the keyhole-slot of the fitting.

9. The pin pulling tool of claim 1, further comprising:
    a coupler interface barrier associated with at least a portion of a surface of the fitting contacting at least a portion of a surface of the workpiece, the coupler interface barrier providing a scratch-resistant padding across a surface of the fitting contacting the workpiece.

10. The pin pulling tool of claim 1, wherein the fitting is removably coupled to the end of the threaded screw, and further comprising:
a plurality of fittings wherein an interchangeable fitting in the plurality of fittings comprises a keyhole-slot configured to receive the head of the pin in a plurality of pins having a plurality of different pin sizes and shapes of the heads of the pins, wherein the pin pulling tool is modular, and wherein the interchangeable fitting is configured to interchangeably couple to the pin pulling tool.

11. The pin pulling tool of claim 1, wherein the fitting is coupled to the end of the threaded screw by at least one of welding, bonding or a press-fit.

12. The pin pulling tool of claim 1, wherein the rotational end-piece further comprises an integrated socket configured to removably couple to a drive head of a bolt.

13. The pin pulling tool of claim 1, further comprising:
a chamfer associated with the fitting, wherein the chamfer minimizes sharp edges associated with an interface between the fitting and at least a portion of a surface of the workpiece.

14. A method of pin fastener removal using a pin removal tool, the method comprising:
engaging a tool body over a pin, wherein the tool body comprises a workpiece interface surface and opposing side edges having a plurality of contoured recesses configured to generally align with fingers of a user to enable the user to grip the tool body with a head of the pin partially inserted into a workpiece;
sliding a fitting coupled to an end of the tool body over the head of the pin, wherein the fitting comprises a keyhole-slot configured to receive the head of the pin, where the keyhole-slot is configured to engage the head of the pin received within the keyhole-slot; and
turning a rotational end-piece coupled to a threaded screw to rotate and displace the threaded screw relative to the tool body to cause the fitting to pull the head of the pin received within the keyhole-slot to thereby remove the pin from the workpiece.

15. The method of claim 14, wherein the keyhole-slot further comprising:
sliding a set of space-apart jaws beneath the head of the pin to grip the head of the pin within at least a portion of the fitting.

16. The method of claim 14, further comprising:
lowering a closure sleeve over the fitting, wherein the closure sleeve encloses the fitting and the head of the pin that is received within the keyhole-slot of the fitting to prevent the fitting from sliding off the head of the pin during pin removal.

17. The method of claim 14, wherein the fitting is a first fitting removably coupled to an end of a threaded screw, and further comprising:
removing the first fitting from the end of the threaded screw, wherein the first fitting comprises a first keyhole-slot conforming to a first pin having a first size of the head of the pin; and
attaching a second fitting to the end of the threaded screw of the tool body, wherein the second fitting comprises a second keyhole-slot conforming to a second pin having a second size of the head of the pin.

18. The method of claim 14, further comprising:
sliding a closure sleeve up into an open position to expose the fitting and the head of the pin that is received within the keyhole-slot of the fitting, wherein the closure sleeve prevents the fitting from sliding off the head of the pin during pin removal while in a closed position.

19. The method of claim 14, further comprising:
turning the rotational end-piece in a clockwise or counter-clockwise direction to raise a height of the fitting within the tool body and pull the pin out of the workpiece.

20. A modular pin pulling tool, comprising:
a tool body having a workpiece interface surface, a threaded hole and opposing side edges having a plurality of contoured recesses configured to generally align with fingers of a user to enable the user to grip at least a portion of the tool body;
a threaded screw, disposed in and rotatable relative to the threaded hole in the tool body;
an interchangeable fitting removably coupled to an end of the threaded screw that is proximate the workpiece interface surface, the interchangeable fitting having a keyhole-slot configured to receive a head of a pin, where the keyhole-slot defines a set of spaced-apart jaws configured to engage the head of the pin that is received within the keyhole-slot;
a closure sleeve configured to encompass the interchangeable fitting and the head of the pin that is received within the keyhole-slot of the interchangeable fitting; and
a rotational end-piece coupled to the threaded screw, configured to rotate and displace the threaded screw relative to the tool body to cause the interchangeable fitting and the set of spaced-apart jaws to pull the head of the pin received within the keyhole-slot, to thereby remove the pin from a workpiece.

* * * * *